US006973792B2

(12) United States Patent
Hicks

(10) Patent No.: US 6,973,792 B2
(45) Date of Patent: Dec. 13, 2005

(54) METHOD OF AND APPARATUS FOR A MULTI-STAGE BOUNDARY LAYER ENGINE AND PROCESS CELL

(76) Inventor: Kenneth Hicks, 8916 E. Plymouth Dr., Mesa, AZ (US) 85207

( * ) Notice: Subject to any disclaimer, the term of this patent is extended or adjusted under 35 U.S.C. 154(b) by 0 days.

(21) Appl. No.: 10/676,827

(22) Filed: Oct. 2, 2003

(65) Prior Publication Data

US 2005/0169743 A1    Aug. 4, 2005

Related U.S. Application Data

(60) Provisional application No. 60/415,239, filed on Oct. 2, 2002.

(51) Int. Cl.$^7$ ................................................ B63H 9/02
(52) U.S. Cl. .......................... 60/805; 60/723; 415/90; 416/4; 416/219 A; 416/220 A
(58) Field of Search .............................. 415/90; 416/4, 416/204 R, 219 A, 220 A; 60/723, 805

(56) References Cited

U.S. PATENT DOCUMENTS

| | | | |
|---|---|---|---|
| 1,061,142 A | | 5/1913 | Tesla |
| 1,061,206 A | | 5/1913 | Tesla |
| 3,224,194 A | * | 12/1965 | De Feo et al. ................. 60/793 |
| 3,899,875 A | * | 8/1975 | Oklejas et al. ........... 60/39.511 |
| 4,449,888 A | * | 5/1984 | Balje .......................... 415/143 |
| 5,470,197 A | | 11/1995 | Cafarelli ....................... 415/90 |
| 6,375,412 B1 | | 4/2002 | Dial ............................. 415/90 |
| 6,503,067 B2 | * | 1/2003 | Palumbo ..................... 417/407 |
| 6,568,900 B2 | * | 5/2003 | Conrad et al. ................. 415/90 |
| 2004/0216466 A1 | * | 11/2004 | Bosen ........................... 60/805 |

OTHER PUBLICATIONS http://www.stanford.edu/~hydrobay/lookat/tt.html—"The Tesla Boundary Layer Turbine" (Jul. 19, 2003), Alan Swithenbank [copies of links, including figures, are attached].

* cited by examiner

Primary Examiner—Ehud Gartenberg
(74) Attorney, Agent, or Firm—Greenberg Traurig, LLP; Richard E. Kurtz, II; James E. Goepel

(57) ABSTRACT

A multi-staged boundary layer engine and process cell, (based on the effect known as adhesion and viscosity) which achieves high thermal efficiencies and high mechanical power output for use in the power generation, geothermal, energy recovery, solar, transportation, hydrogen production, desalinating water and hydroelectric fields. The design is novel with a dovetail attachment of the disc packs, allowing lower stress and allowing the use of next generation materials such as ceramics, composites and nanocomposites to improve the maximum temperature and the maximum RPM of the engine, thereby producing more horsepower and torque. In addition, this invention includes multi-stage vacuum, an external combustion chamber and condenser stages to improve the vortex flow through the primary disc pack cell. This engine will also encompass a closed loop cycle for ultimate efficiencies. This invention will also include the use of catalysts and/or electrical polarities applied to the disc pack and the disc pack/casing respectively to achieve low $NO_x$ and also to achieve process cell capability for applications such as desalinization and hydrogen generation.

12 Claims, 40 Drawing Sheets

METHOD OF AND APPARATUS FOR A MULTI-STAGE BOUNDARY LAYER ENGINE AND PROCESS CELL

This application is related to, and claims the benefit of, Provisional U.S. patent application Ser. No. 60/415,239, filed Oct. 2, 2002, which is incorporated herein by reference in its entirety.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to the field of power generation, and more particularly it pertains to engines of a continuous and or impulse combustion type, which utilize boundary layer effects. The present invention can also act as part of a process, rather than simply performing a function. It also has the capability to act as a power generation unit and a process at the same time, (e.g. producing hydrogen, desalinating water, or the like).

BACKGROUND OF THE INVENTION

In 1903, Nikola Tesla engineered a type of steam turbine, for which he was granted U.S. Pat. No. 1,061,142 on May 6, 1913, and U.S. Pat. No. 1,061,206 on May 6, 1913, the teachings of which are incorporated herein in their entirety. This type of turbine is commonly referred to as a continuous combustion turbine or a boundary layer turbine. FIGS. 1a and 1b illustrate a conventional, continuous combustion turbine. Continuous combustion turbines generally can perform two very different functions. In one arrangement, the turbine can serve as a motor, powering an external device. In another arrangement, the turbine can be used as a pump.

The principles for operation of the typical continuous combustion turbine illustrated in FIGS. 1a and 1b are well documented and should be known to one skilled in the art. Briefly, a continuous combustion turbine operating as a motor generally consists of a serial connection of a compressor element (not shown) and a motor element 19. Motor element 19 includes a plurality of parallel discs 13, which are mounted to a central drive shaft 16 through mounting brackets 15. Motor element 19 also typically includes an inlet port 25 and an outlet port 20.

As the compressor element compresses a gas or fluid, the compressed gas or fluid is forced into motor element 19 through inlet port 25. The inlet port is generally configured such that the compressed gas or fluid strikes discs 13 substantially tangential to the circumference of the discs. Through adhesion, the compressed gas or fluid causes the discs to rotate as the compressed gas or fluid works its way to outlet ports 20 via holes 14 in discs 13. As described above, drive shaft 16 is connected to discs 13 through mounting bracket 15, and drive shaft 16 rotates with discs 13, thereby providing motive power to a device mounted to drive shaft 16 outside of motor element 19. Drive shaft 16 also serves to support discs 13 within motor element 19.

In typical continuous combustion engines, the engine can be operated in reverse simply by causing the compressed gas or fluid to strike the discs 13 on the opposite side. For example, in FIG. 1a, if the compressed gas or fluid entered motor element 19 through the left-hand inlet port 25, discs 13 would rotate in a counter-clockwise manner. However, if the compressed gas or fluid entered chamber 19 through the right-hand inlet port 25, discs 13 would rotate in a clockwise manner.

The continuous combustion turbine can also be used as a pump. Rotating drive shaft 16 causes discs 13 to rotate. If a fluid or gas is present in housing 19, discs 13 can cause the fluid to be pulled from outlet 14, and ejected at a higher pressure via inlet 28.

Continuous combustion turbines are advantageous over other, more traditional fluid-based turbines because the motive force is supplied without the need for fans or other such devices. Fans, for example, are subject to significant stress as the fluid impacts the fan blades. This can lead to damage of the blades, and can result in the introduction of foreign matter into the fluid. In a closed-loop system, the foreign matter may be repeatedly injected into the engine compartment at high speed, and this can quickly result in catastrophic damage to both the blades and the engine itself.

Some in the prior art have adapted the basic Tesla boundary layer turbine design for specific uses. For example, U.S. Pat. No. 6,503,067, to Palumbo, the teachings of which are incorporated herein by reference in their entirety, discloses a bladeless multi-disc turbocharger for use with an internal combustion engine. Similarly, U.S. Pat. No. 6,375,412, to Dial, the teachings of which are incorporated herein by reference in their entirety, discloses a multi-disc impeller for pumps, turbines, and the like. While these references have applied and made minor modifications to the basic Tesla design, these adaptations have made only minor advancements in the art.

SUMMARY OF THE INVENTION

What is needed is a higher-level analysis of the fundamental adhesion and viscosity properties exploited by the basic boundary layer turbine to improve the overall state of the art. The present invention is directed to an improved method of and apparatus for a multi-stage boundary layer turbine and process cell that substantially obviates one or more of the problems due to limitations and disadvantages of the related art. Additional features and advantages of the invention will be set forth in the description which follows, and in part will be apparent from the description, or may be learned by practice of the invention.

The objectives and other advantages of the invention will be realized and attained by the structure particularly pointed out in the written description and claims hereof as well as the appended drawings. To achieve the objectives and other advantages, and in accordance with the purpose of the present invention as embodied and broadly described herein, in one aspect of the present invention there is provided a power generation system and/or process cell which achieves high thermal efficiencies and high mechanical power output for use in power generation, geothermal, energy recovery, solar, transportation, fuel production, desalination process, hydroelectric and related fields.

The present invention also provides a power generation system comprised of a series of stages which are formed or made of disc pack configurations. The different stages provide torque to a main output shaft. The stages preferably include compressor, turbine and/or vacuum stages. According to a preferred embodiment, the compressor stage feeds external combustors which provide power to the turbine. This power is then preferably fed into the vacuum stages. A vacuum source at the exhaust end of a water turbine can increase the efficiency of the turbine 3–4% for every cubic inch of water pulled.

The present invention also provides a power generation system which preferably utilizes a technique based on the adhesion and viscosity of different mediums. The viscosity of the medium used to supply energy to the engine can be used to set the disc pack spacing. For example, the gap between the disks may be closer when air is the energy supply medium as compared to when steam is the energy supply medium because steam has a higher viscosity than air.

The present invention also provides a power generation system preferably comprised of a condenser between the disc pack turbine and disc pack vacuum stage. Another aspect of the present invention provides a power generation system energy source which can be run as a closed-loop system. In a closed-loop configuration heat exchanger can supplement or even replace the combustion cans.

The present invention also provides a power generation system which may be comprised of all ceramic discs for use in high temperature environments for increased efficiencies. Another feature or aspect of the present invention provides a power generation system which incorporates ceramic coatings, alloy coatings and nanocomposite coatings such as, but not limited to, nanocomposite mesoporous ceramics, to enhance the boundary layer effect. These coatings can also allow a turbine to operate at a higher temperature without the need for exotic materials.

The present invention may also incorporate a catalyst coating which reduces emissions. The present invention also provides a power generation system which may incorporate or use a catalyst coating which also allows the engine to act as a process for producing hydrogen, as well as desalinating water, and other such purposes.

The present invention also provides a power generation system which can employ the use of water injection in a nozzle system which will add higher efficiencies as well as reducing $NO_x$.

Another aspect of the present invention provides a power generation system which incorporates catalytic combustors with water-cooling. The cooling water for the combustors is preferably preheated and then injected into water injection ports of the nozzles.

Another aspect of the present invention provides a power generation system which incorporates multiple catalytic combustors with water cooling. The use of multiple nozzles increases power output.

It is to be understood that both the foregoing general description and the following detailed description are exemplary and explanatory and are intended to provide further explanation of the invention as claimed.

Accordingly, it is the objective of the claimed invention to increase the efficiency, reliability and flexibility of continuous and/or impulse combustion turbine technology. The present invention may also be applied with like effect apart from present turbine processes and is intended for the broad purpose of producing power through a variety of mediums including gasoline, diesel, natural gas, biomass, methane, hydrogen, propane, liquid propane gas (LPG), steam, geothermal, solar hybrid, water, and the like.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 32a, 32b, and 32c are detailed views of the front, side, and backs, respectively, of discs preferably employed in the embodiment illustrated in FIG. 23.

DETAILED DESCRIPTION OF THE PREFERRED EMBODIMENT

Reference will now be made in detail to preferred embodiments of the present invention, examples of which are illustrated in the accompanying drawings. Although this specification frequently makes reference to gases, liquids, and combinations thereof, it should be apparent to one skilled in the art that gases may be substituted for liquids, and liquids substituted for gases, without departing from the spirit or the scope of the present invention.

Figure 1A:
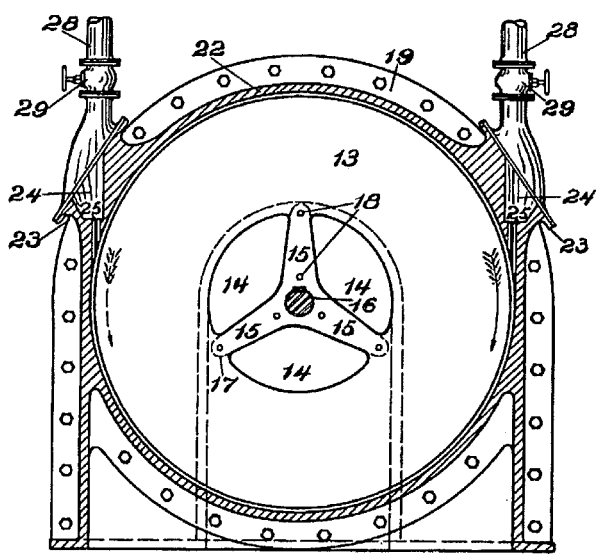
FIGS. 1a and 1b provide a schematic of a prior art disk turbine configuration.
Figure 1B:
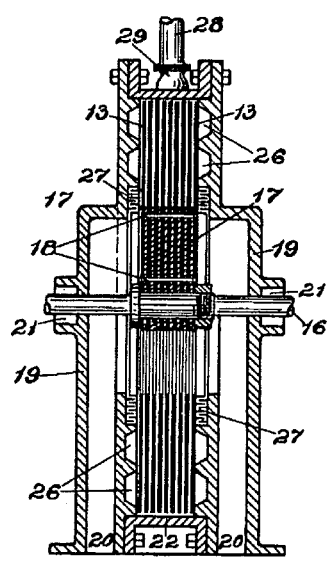
Figure 2:
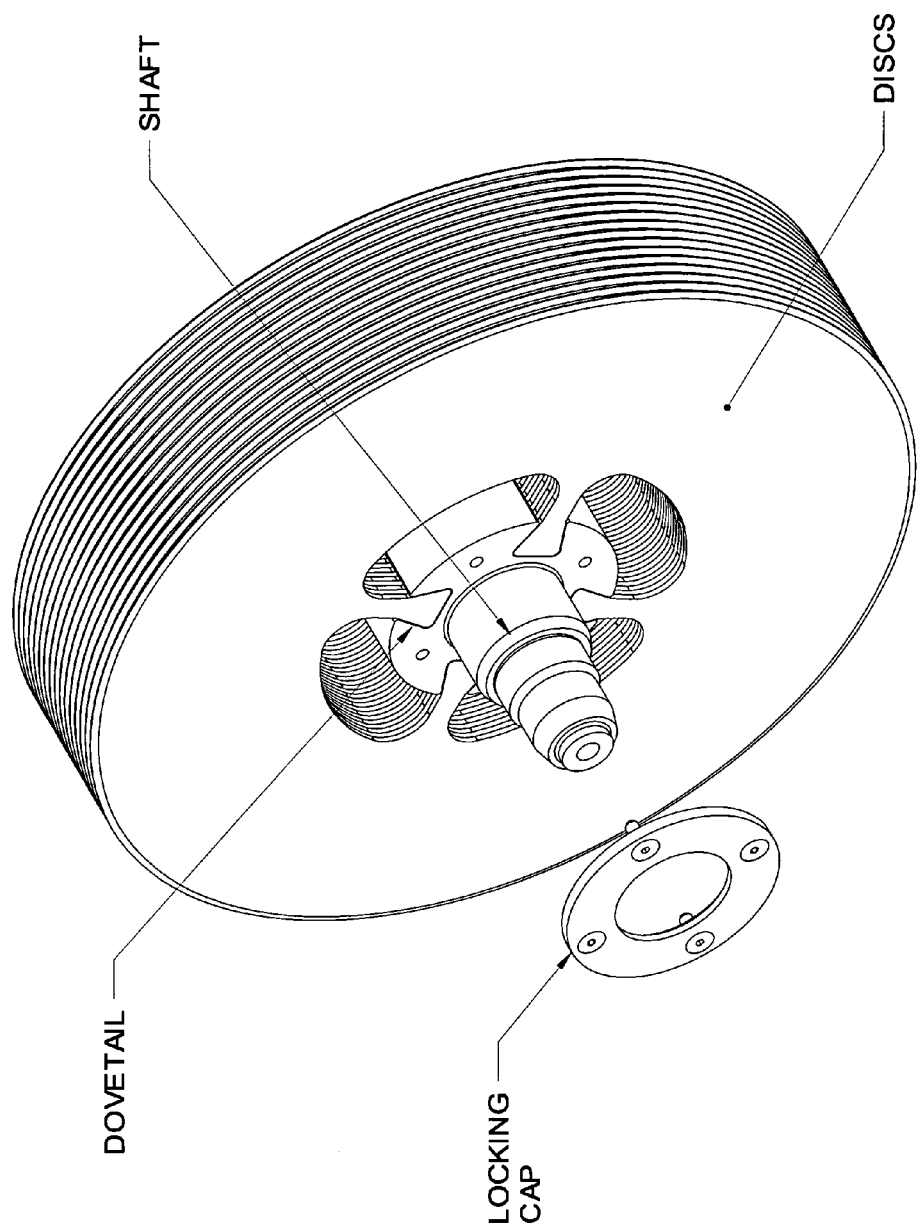
FIG. 2 is an illustration of a disk pack mounted to a shaft with a locking plate using an internal dovetail configuration

FIG. 2 is an illustration of a disk pack 1 mounted to a shaft 3 with a locking plate 2 using an internal dovetail configuration 4. The dovetail attachment means 4 reduces stress at the spoke interfaces when disk pack 1 is operated at high RPM's or at high temperatures compared to the prior art. It also provides more stability and increases the ability to statically and dynamically balance disc pack 1. Through this configuration, balancing can be accomplished by simply modifying locking plate 2 versus modifying disk pack 1. Although an internal dovetail configuration is illustrated in FIG. 2, it should be apparent to one skilled in the art that alternative configurations, including, without limitation, an external dovetail configuration such as that illustrated in FIG. 3, can be substituted therefore without departing from the spirit or the scope of the invention.

Figure 4:
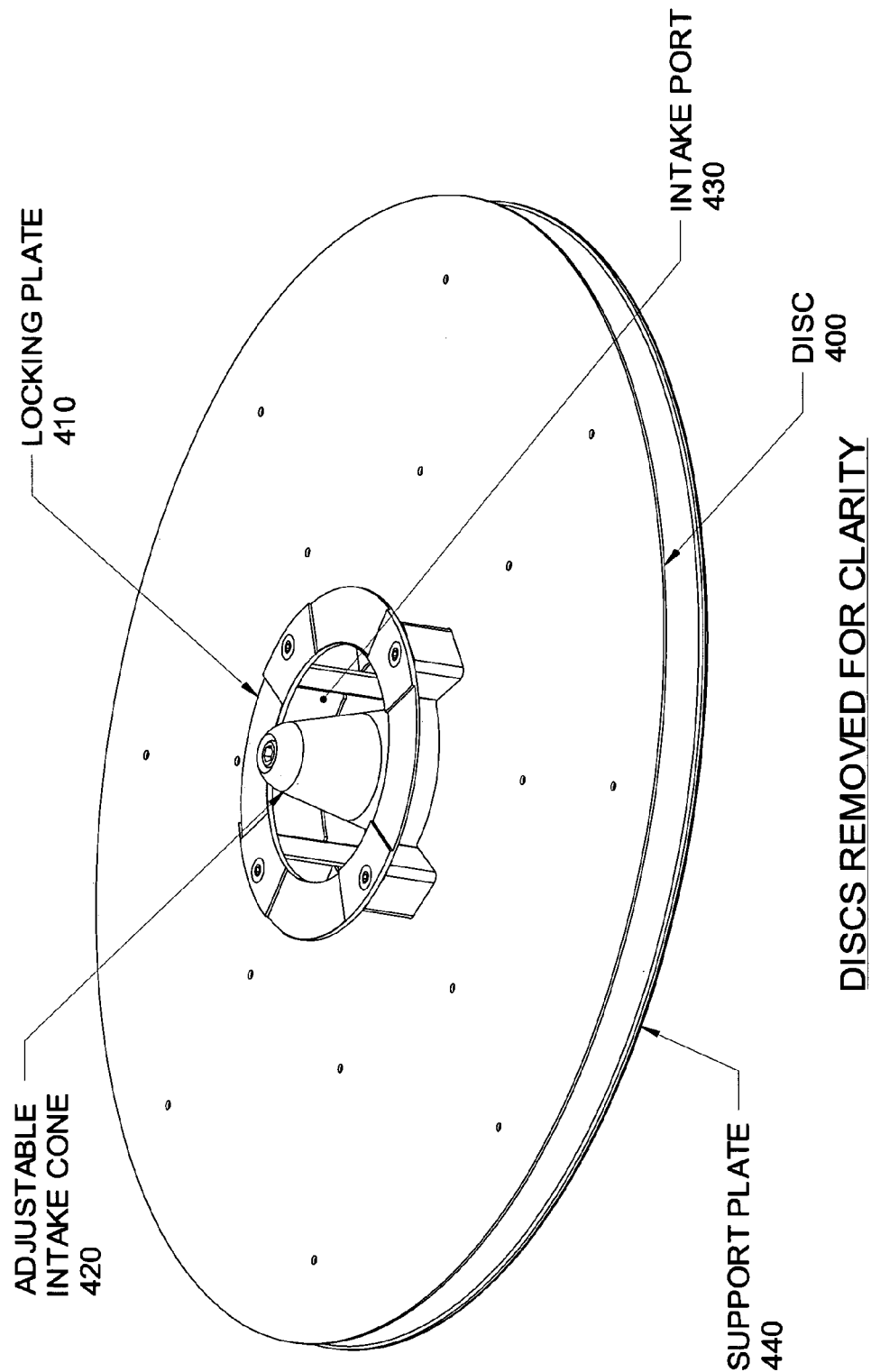
FIG. 4 is an illustration of a single, one piece disk pack made of ceramics.

As illustrated in FIG. 4, an internal dovetail mounting means preferably involves cutting or otherwise causing dovetail receivers to be created in disc 400. As FIG. 5 further illustrates, a support plate 510, onto which a plurality of dovetail supports 500 have been preferably mounted or otherwise attached, can be used to mount individual discs or a single-piece disc pack. Referring again to FIG. 4, a locking plate 410 can laterally secure disc 400, a collection of discs, or a single piece disc pack, to support plate 440.

Figure 3:
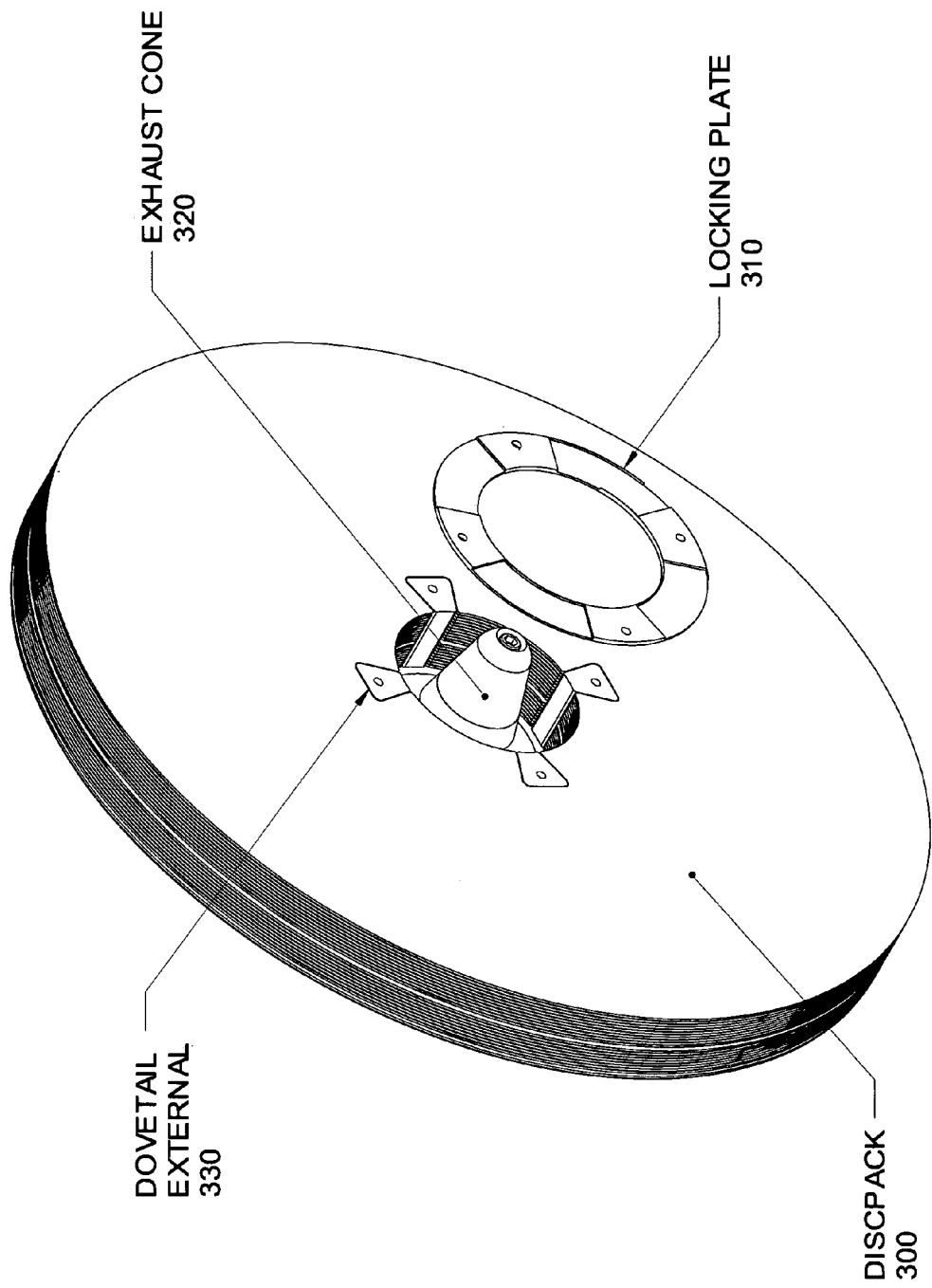
FIG. 3 is an illustration of a disk pack mounted to a shaft with a locking plate using an external dovetail configuration.
Figure 5:
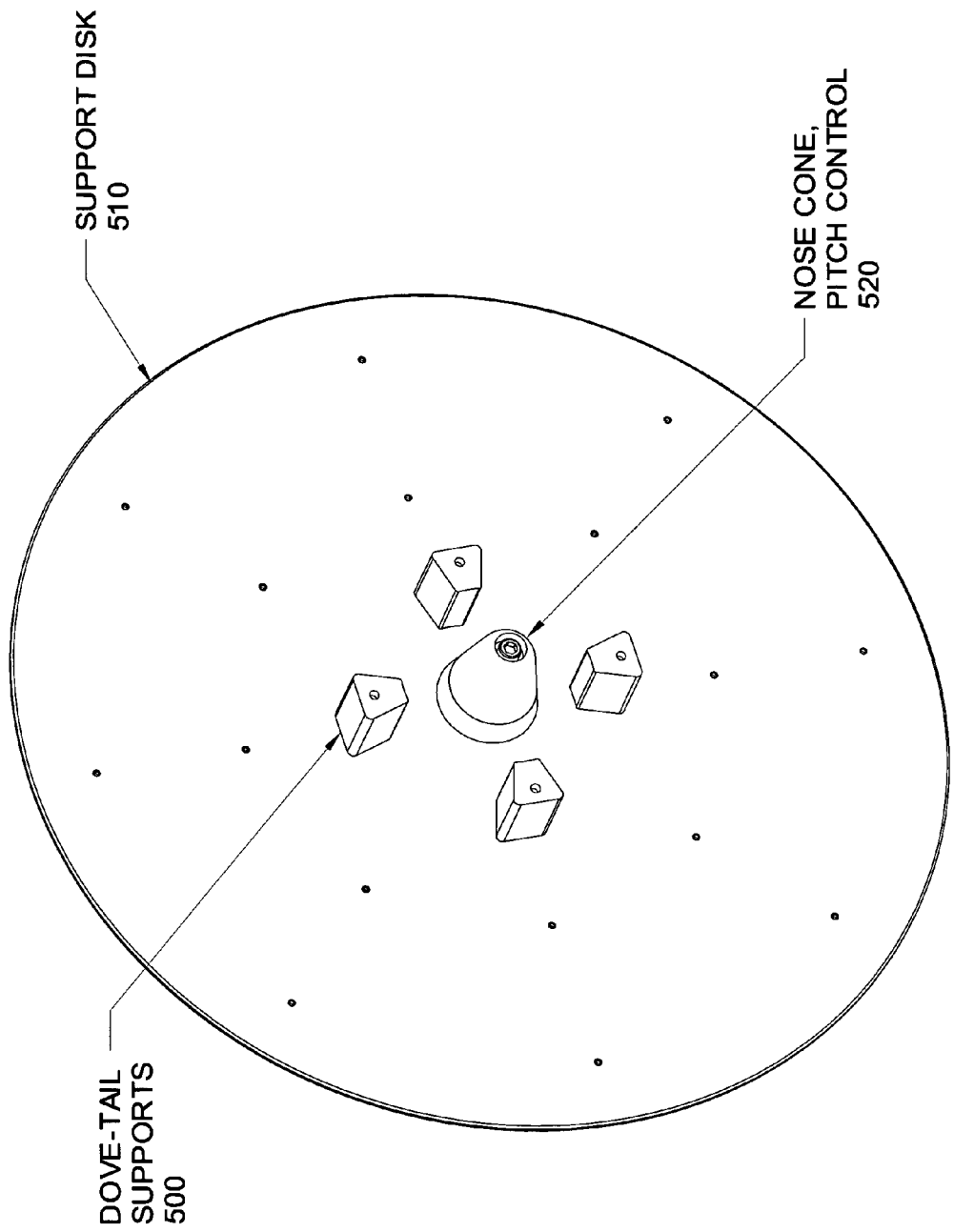
FIG. 5 is an illustration of a disk with a nose cone and pitch control
Figure 13:
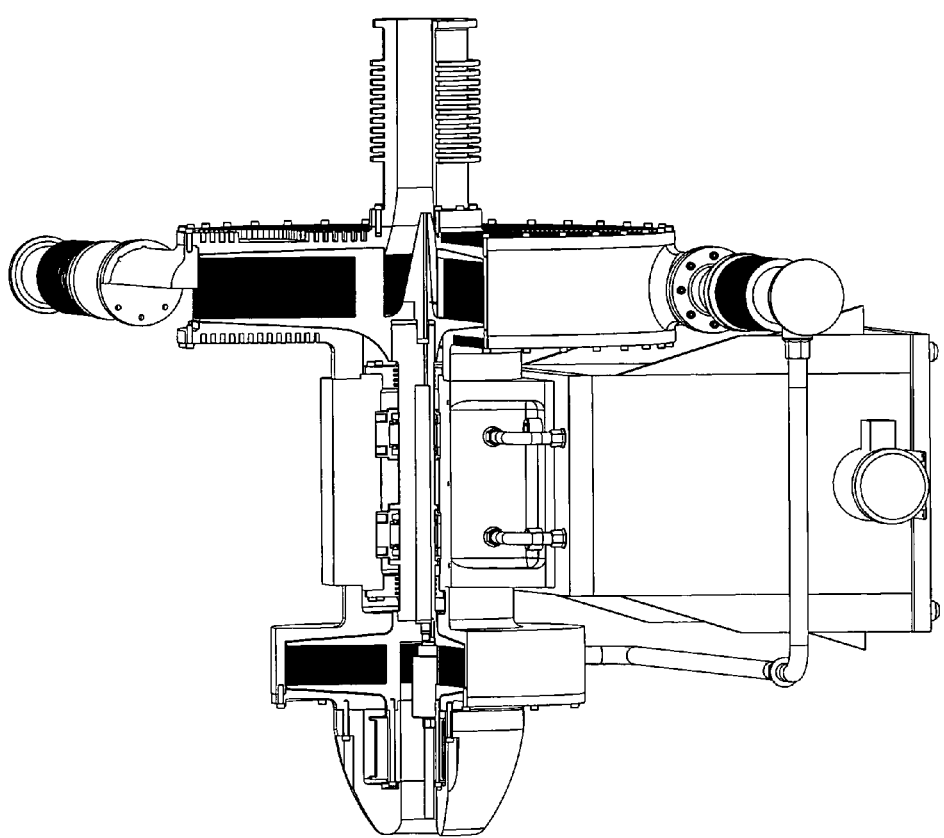
FIG. 13 is a cut-away front perspective view of a closed loop system similar to that illustrated in FIG. 11.
Figure 14:
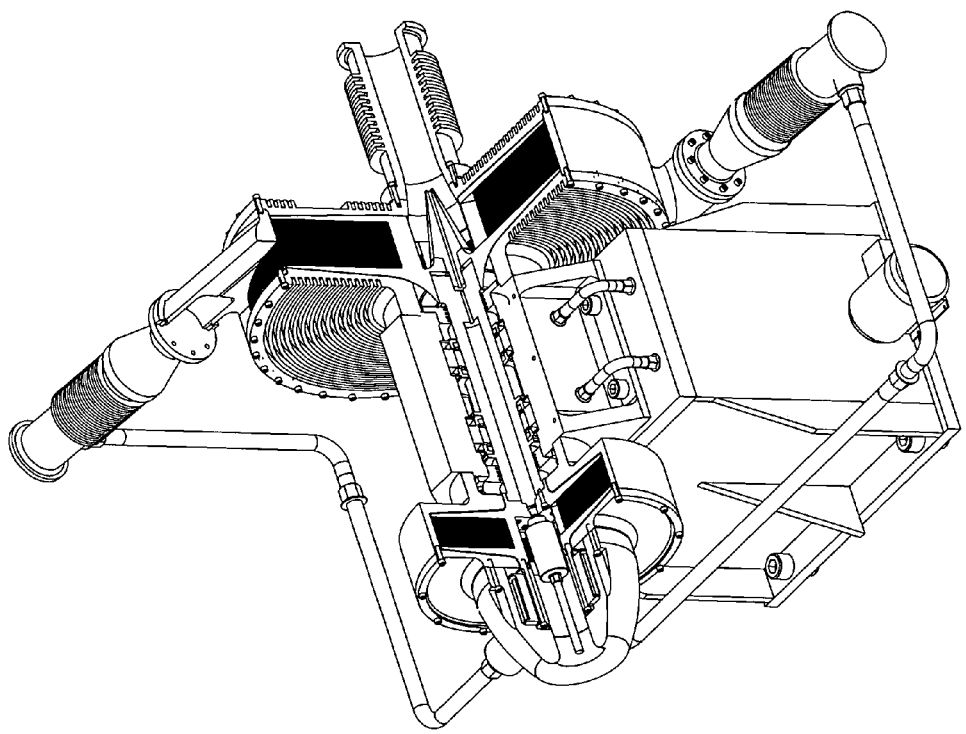
FIG. 14 is a cut-away left-hand perspective view of a closed loop system similar to that illustrated in FIG. 11.
Figure 15:
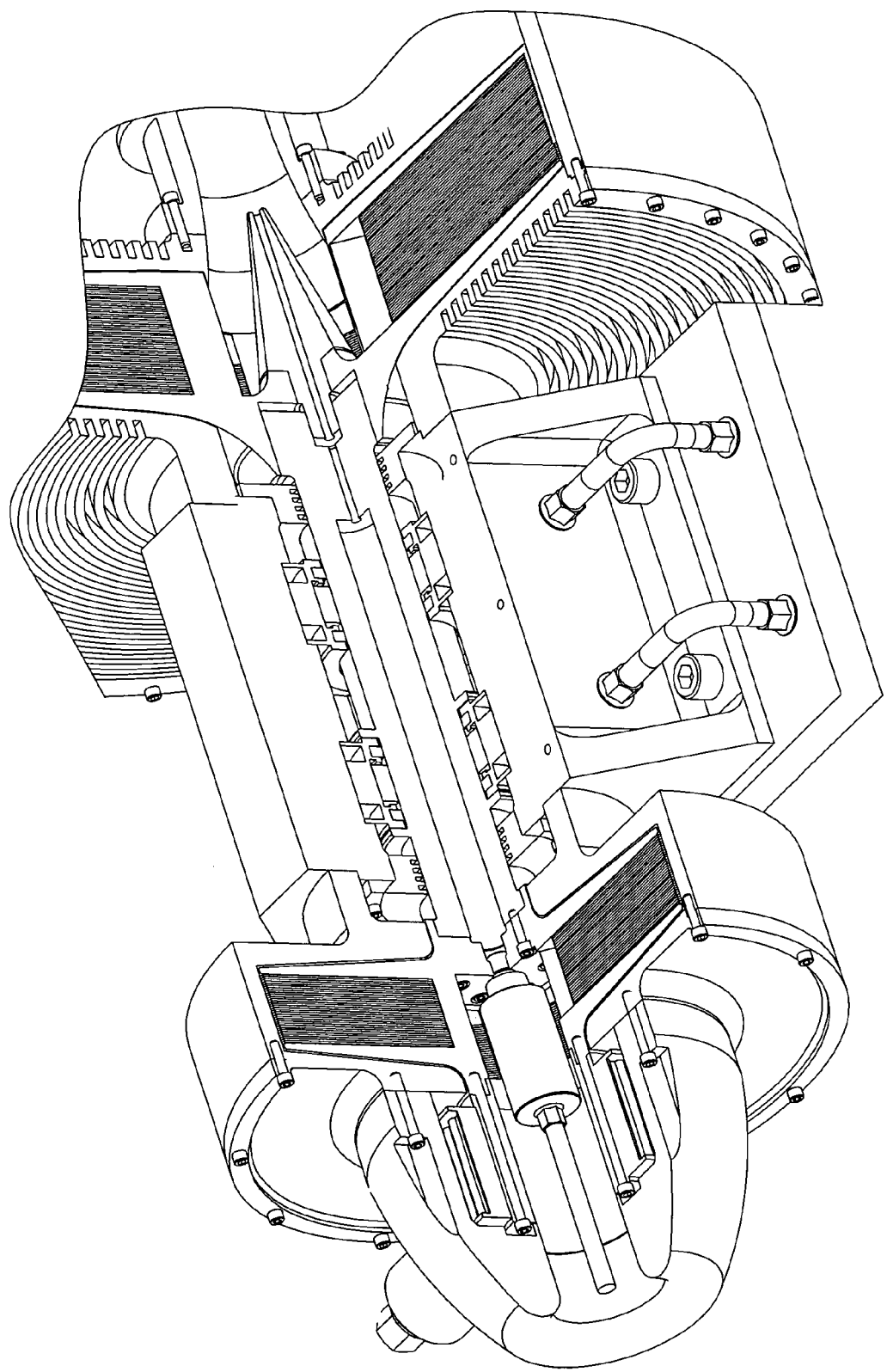
FIG. 15 is a close-up view of the vacuum and generator stages illustrated in FIG. 14.

As illustrated in FIGS. 3 through 5, an external dovetail mounting means eliminates the need for a center shaft that passes through a disc pack, and is also advantageous because it provides a mounting configuration which can be directly attached to a main shaft. An external dovetail configuration also preferably contains an adjustable exhaust cone 520 which can be tailored to accommodate the medium being used without having to modify the disc pack. This allows the thrust performance for a desired application to be modified if needed. This is illustrated in FIGS. 13 through 15. A pressurized fluid can be fed into the engine through a device similar to rotating union 1510 on the intake stage to the center of the shaft. Varying the pressure within rotating union 1510 can change the geometry of exhaust cone 1520. This principle can act as a throttle for the engine. The exhaust cone geometry can be varied by expanding the tail end of the exhaust cone, by moving the exhaust cone axially to close the exhaust gap, or by other such functions.

The configuration of FIGS. 3 through 5 also lends itself towards use as a pump. As should be clear from FIGS. 3 through 5, there are no unwanted spokes to impede the medium being pumped. The elimination of spokes and a mounting shaft strongly reduces the possibility of damage to the pump or the pumped medium, and also reduces clogging concerns.

The internal and external dovetail mounting methods illustrated in FIGS. 2 through 5 allow the turbine to operate at higher speeds by imparting less stress at the disc mounting points. The present invention also reduces stress concentrations, corrosion, and fretting in the main shaft frequently encountered in the more traditional keyway mounting technique, and also reduces backlash effects. A dovetail, shaftless mounting means also allows the exhaust to exit closer to the center of rotation and allows for internal shaft cooling, which lends itself to the possibilities of condensing fluid within the engine.

Figure 6:
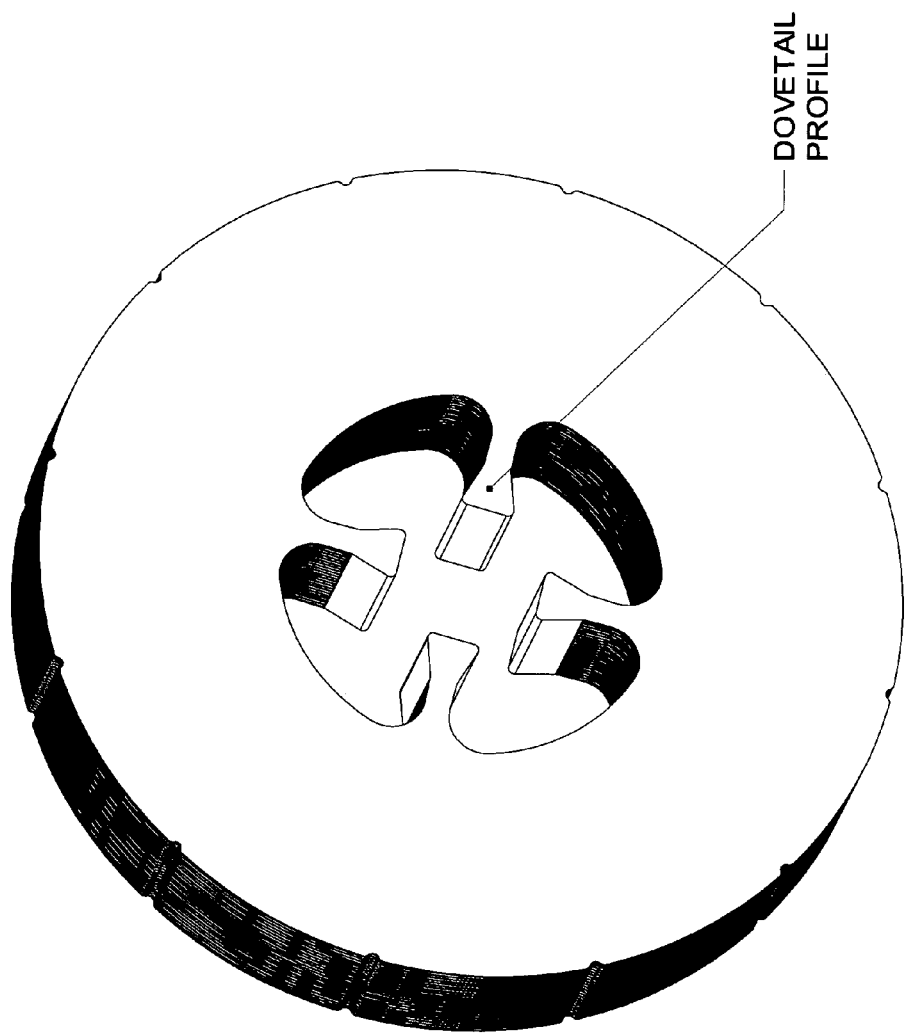
FIG. 6 is an illustration of a single unit disk ceramic disk pack.

Another aspect of the present invention is the creation of disc packs as single piece parts as illustrated in FIG. 6. By way of example, without intending to limit the present invention, a ceramic disc pack may be made through laser sculpting of a ceramic block, forming the ceramic into the desired shape through the use of a mold, creating the disc pack using a process similar to stereo lithography, or other such manufacturing techniques which are well known in the art. The use of a single piece part has several advantages, including, but not limited to, reducing the total number of parts in the engine, simplifying design and engineering concerns, reducing the likelihood of noise, reducing the points at which failure may occur. Ceramic disc packs are presently preferred as manufacturing the disc from ceramics allows the discs to run at higher temperatures, thereby increasing efficiency, reducing exhaust emissions, and allowing the engine itself to be used for a variety of purposes including power generation. Ceramic, single-piece disc packs have the added advantage of facilitating nano-scale engine fabrication. This configuration may offer substantial advantages in the small power ranges, such as those used in portable and auxiliary equipment, and in nano-scale pumps for the medical industry.

Still another aspect of the invention is the application of coatings to individual discs or disk packs. Coatings add significant improvements in the way of emission controls, boundary layer control, corrosion protection, and the like. This is discussed in more detail with respect to FIG. 32, below.

Figure 7:
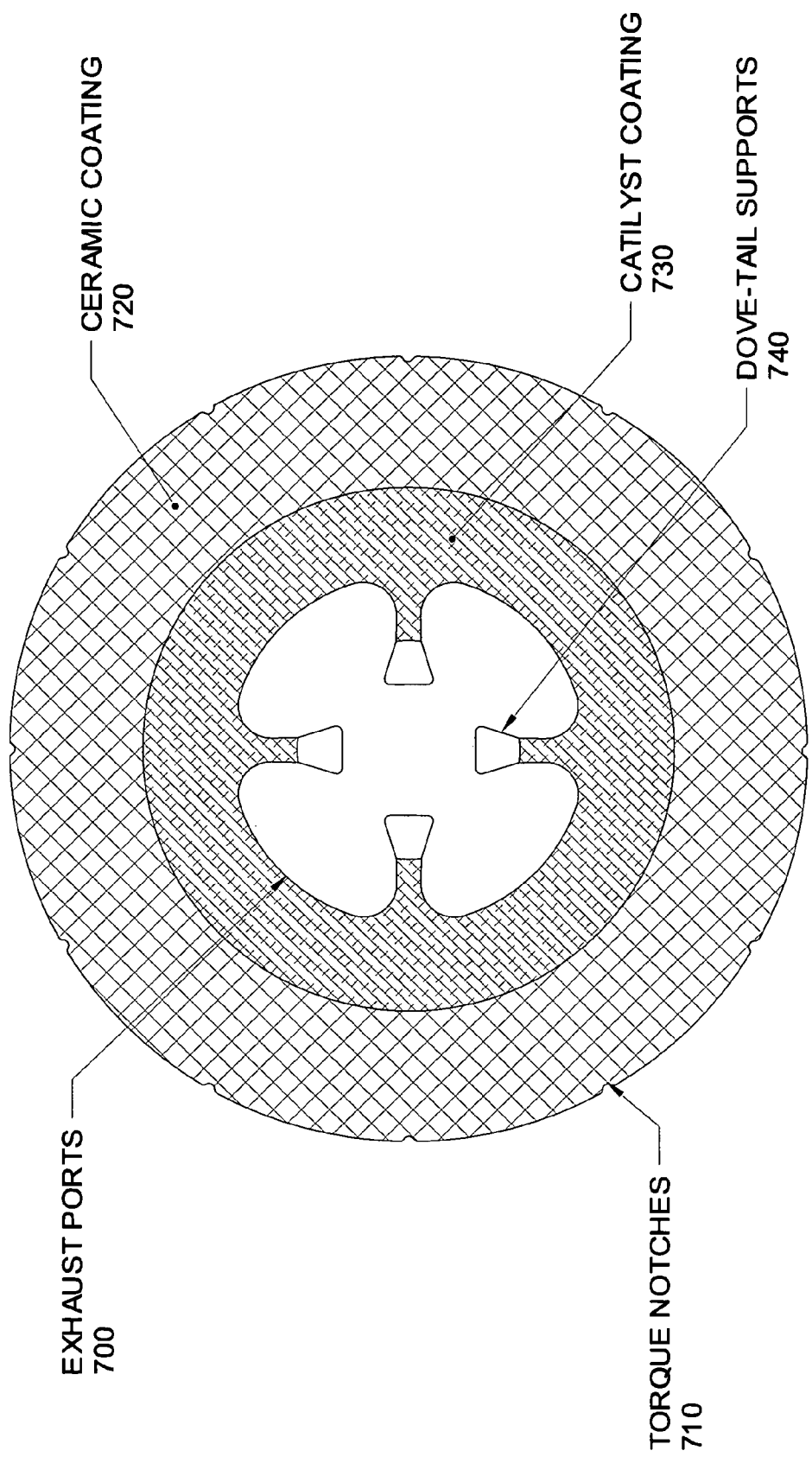
FIG. 7 is an illustration of a ceramic disk with a catalyst coating.

Coatings may also allow an engine to be used as a process. FIG. 7 illustrates coating the disks with a catalyst such as Palladium, Platinum, or other catalysts, which helps reduce emissions and can provide for the "process" function described later. A similar advantage can be realized through the use of alloys or nanocomposite materials embedded with catalysts such as Palladium, Platinum, or other catalysts metals or alloys. The machine process can produce fuels such as Hydrogen by using a catalyst, such as, but not limited to, Platinum, a Nickel-tin alloy, Uranium, Zirconia, and Methanation catalysts, may strip the hydrogen from water molecules which are flowing through the turbine, while at the same time deriving power from the flowing water.

Figure 8:
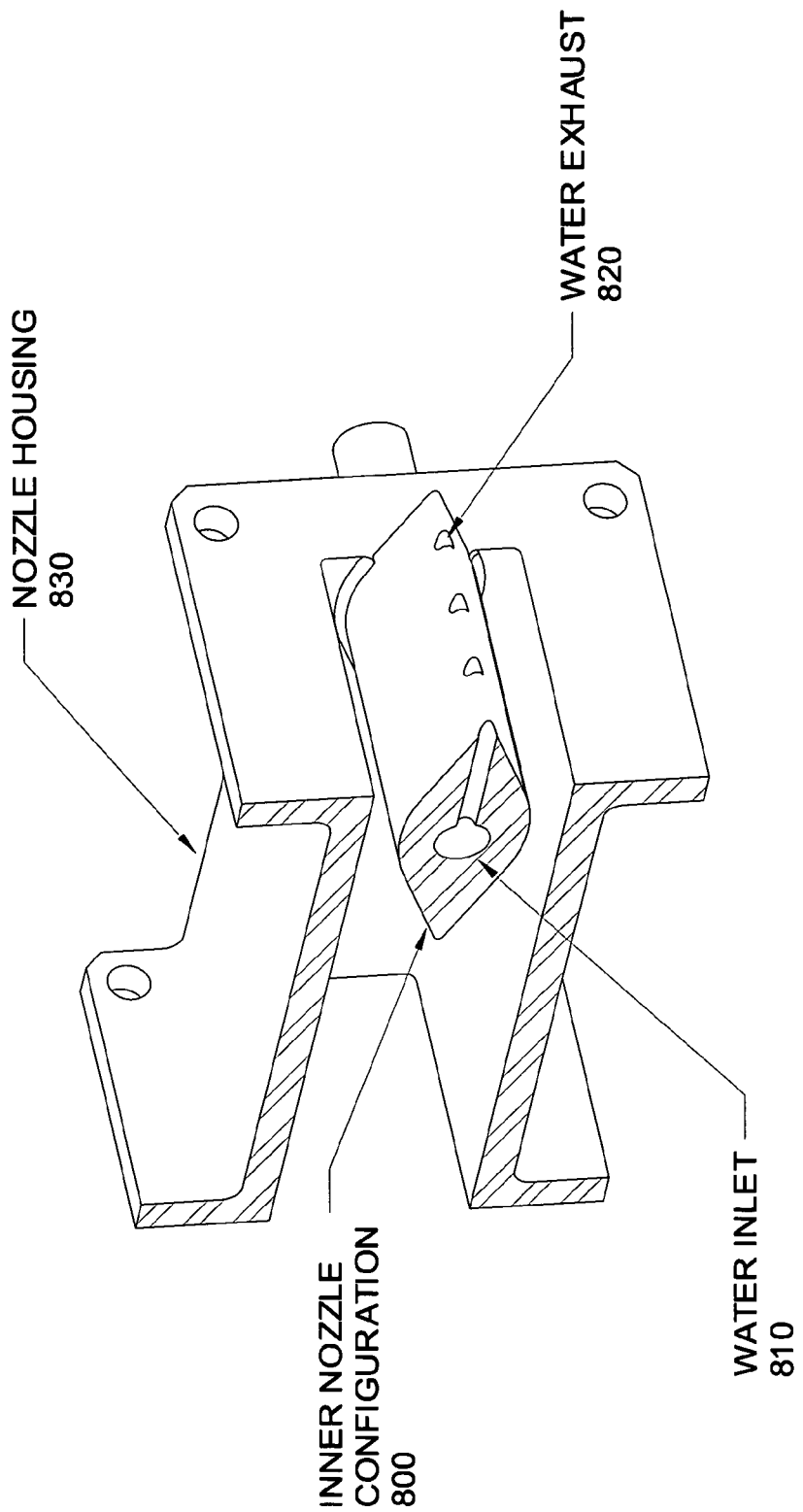
FIG. 8 is an illustration of a single disk employing the use of MEM sensor devices.
Figure 9:
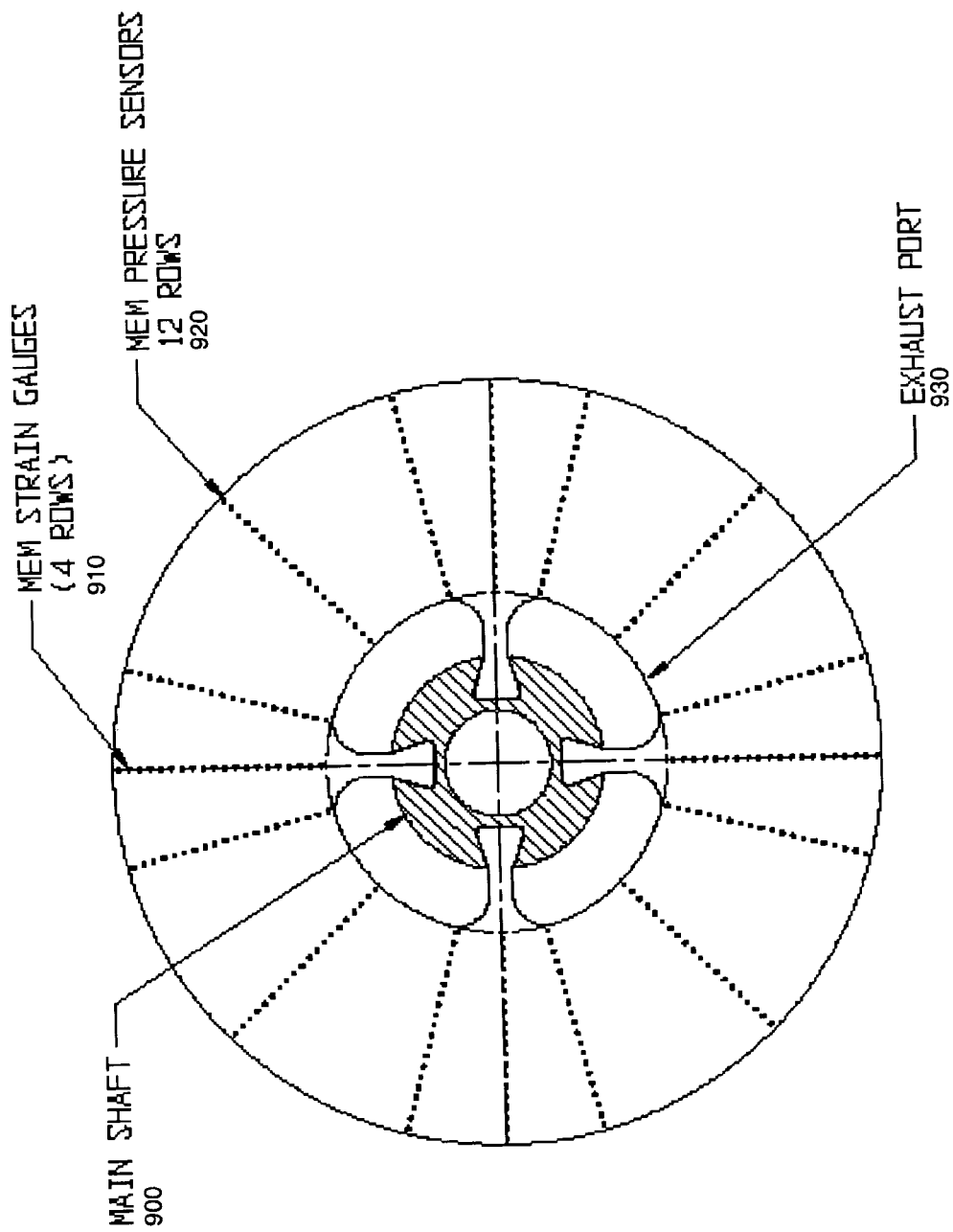
FIG. 9 is an illustration of a Brayton type configuration which includes a built in condenser along with a vacuum stage.

FIG. 8 is an illustration of an inlet nozzle 800 which can inject water or other fluids into the stream of medium entering the nozzle housing 830 through water exhaust ports 820. The combustion nozzle configuration illustrated in FIG. 8 can increase the overall system efficiency, and allows the engine as a process, such as, but not limited to, one that strips hydrogen from injected water. As described above, especially where ceramic discs or disc packs are used, the present invention can be operated at very high temperatures (in excess of 2500 degrees Farenheight). At such temperatures, water injected through water exhaust ports 820 will instantly vaporize, and the water molecules will be in an extremely excited state. By causing the water vapor to interact with a catalyst, individual hydrogen atoms may be stripped from the water molecules. The hydrogen can be captured at the exhaust port, and any remaining water can be captured in a down-stream condenser and recycled to the system.

The combustion chamber nozzle configuration of FIG. 8 also allows the discs to be cleaned without disassembling the entire engine by injecting a cleaning medium through water exhaust 820. Furthermore, the use of convergent and convergent/divergent nozzle systems provides a substantial gain in power output. The engine technology of the present invention also preferably incorporates water injection to reduce $NO_x$, provide power, and increase power output.

FIGS. 6 and 7 also illustrate the use of torque notches on the perimeter of the discs. The torque notches can add to the overall engine power by providing a surface upon which the tangentially-entering fluid may make contact before the fluid begins its boundary layer interaction with the disc.

As illustrated in FIG. 7, the use of microelectromechanical (MEM) sensors provides the ability to monitor engine and disk structures. MEM sensors can be used to provide on-site and remote performance data analysis, which can facilitate detection and correction of potentially catastrophic issues before they become significant.

Figure 10:
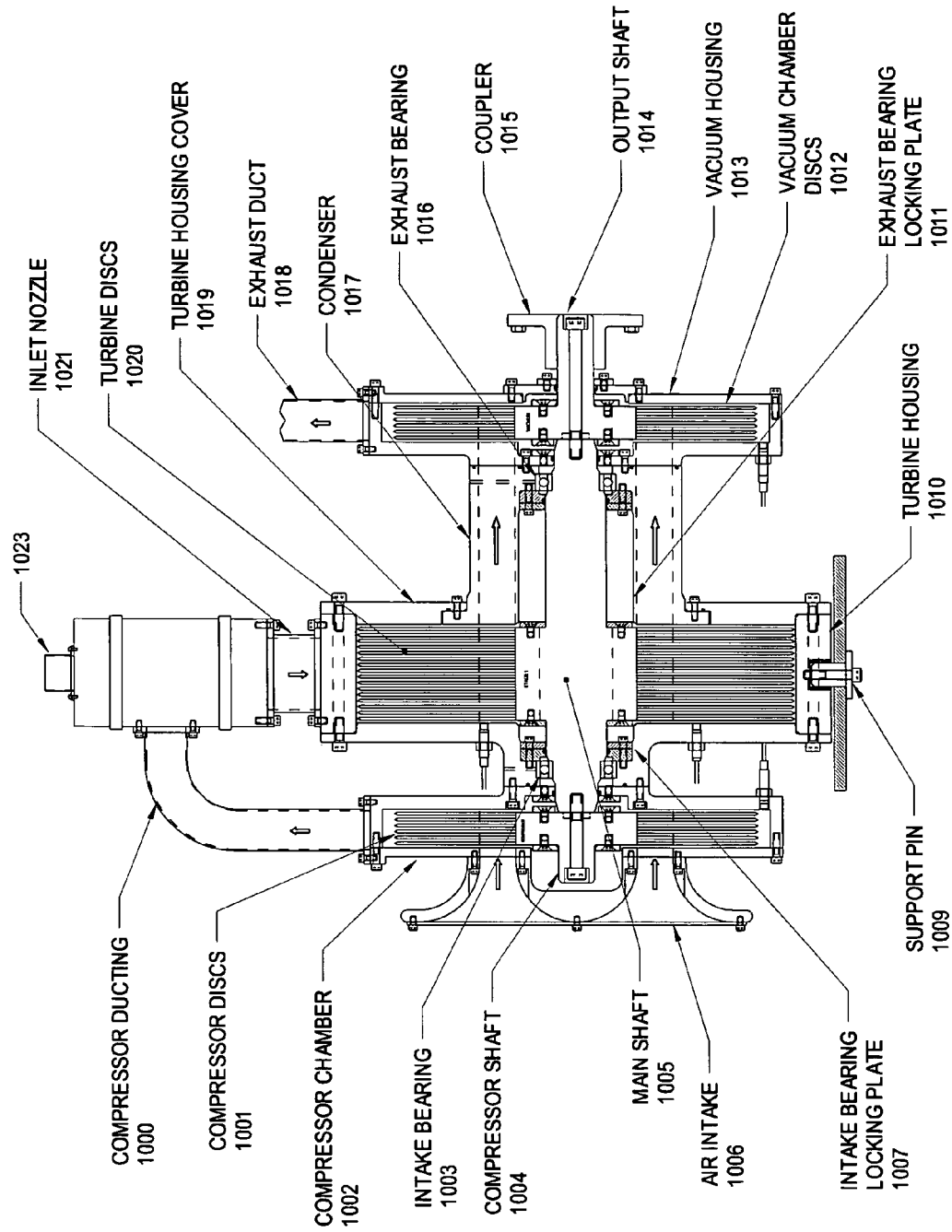
FIG. 10 is an illustration of an inlet nozzle system.

FIG. 10 is an illustration of a Brayton type configuration which includes built-in condenser 1017 and vacuum 1013 stages. The configuration depicted in FIG. 10 is set up as a compressor 1002, turbine 1019, vacuum 1013 stage type embodiment. In this embodiment, external combustion chamber 1022 provides an energy source for turbine stage 1019. Fuel is drawn into combustion chamber 1022 through fuel intake 1023, where it is burned. The heat from the burning fuel causes the air in combustions chamber 1022 to expand, increasing the pressure in the combustion chamber. The heated, compressed air leaves combustion chamber 1022 and enters the main turbine through inlet nozzle 1021. Air is drawn into combustion chamber 1022 through compressor ducting 1000. The engine in the embodiment illustrated in FIG. 10 is able to extract energy from the air drawn into combustion chamber 1022 by placing a compressor chamber 1002 and associated discs 1001 between compressor ducting 1000 and air intakes 1006.

The air passes over the main turbine discs 1020 after exiting combustion chamber 1022, which provides the majority of the power generated by the embodiment of FIG. 10. As described above, the air imparts momentum to turbine discs 1020 through boundary layer effects. The gas exits the main chamber through condenser 1017, and is made available to vacuum stage 1013. Vacuum stage 1013 acts as a pump to draw the air from condenser 1017 and expel it through exhaust duct 1018. It should be noted that, in the embodiment of FIG. 10, compressor 1003, main turbine 1019, and vacuum stage 1013 are all preferably connected to main shaft 1005. Thus, main shaft 1005 provides power to vacuum stage 1013. The vacuum stage illustrated in FIG. 10 can increase turbine efficiency approximately 3–4% for every cubic inch of air pulled by the vacuum stage.

With the removal of compressor stage 1002 and combustion chamber 1022, the engine can run in a closed loop configuration. Such a configuration can be advantageous where the turbine is powered by a steam, geothermal, or other energy source.

The removal of vacuum stage 1013 can allow the engine of FIG. 10 to act as a propulsion system. In such a configuration, thrust from the gas or other medium exiting main turbine 1019 can provide forward momentum.

Figure 11:
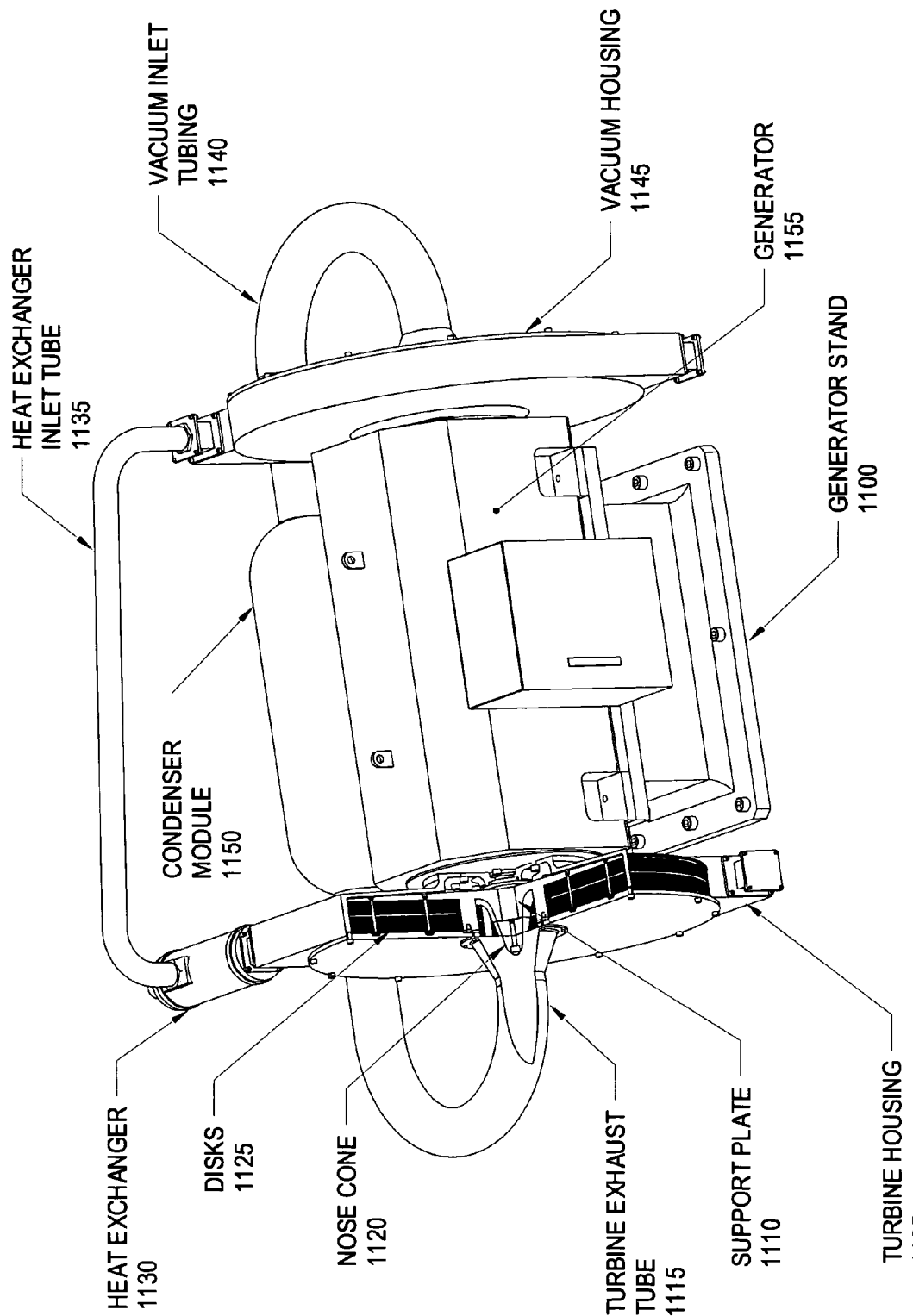
FIG. 11 is an illustration of a closed loop system which has the turbine and vacuum stage on a single shaft.

FIG. 11 depicts a closed loop system mounted on a single, dual-shafted generator 1155, wherein each shaft is preferably connected to discs 1125 using the external dovetail configuration. The embodiment illustrated in FIG. 11 eliminates the need for all components to be mounted in a single case. This embodiment also lends itself to use in a geothermal fluid pressure based system. In such a system, vacuum exhaust tube 1115 may bypass condenser 1150 and may be fed back into heat exchanger inlet tube 1155 from the source.

As described above, the present invention can be used with a variety of energy sources, including, but not limited to, geothermal energy. By way of example, without intending to limit the present invention, a low boiling point medium can be used as the power transfer means within the closed-loop system. In such an embodiment, heat exchanger 1130 can be inserted into an empty oil well, abandoned mine, or the like. Generally, the earth is significantly warmer at those depths, and the geothermal heat will cause the low boiling point medium to vaporize, increasing its pressure. The pressurized gas can be returned to the surface and vented to the turbine discs 1125. The gas can be vented through exhaust tubes 1115 and optionally run through a condenser 1150, which further cools the medium. The cool medium is then drawn out of condenser 1150 through vacuum discs 1145, where it is returned to heat exchanger 1130 through heat exchanger inlet tube 1135. Rotation of the discs can thereby power generator 1155.

Similarly, the embodiment of FIG. 11 can be used to capture thermal energy generated by automobiles and convert it to electrical power. This power can then be stored for subsequent use, and to reduce the load imposed on the engine as more and more electrical devices are introduced into the automobile.

Figure 12:
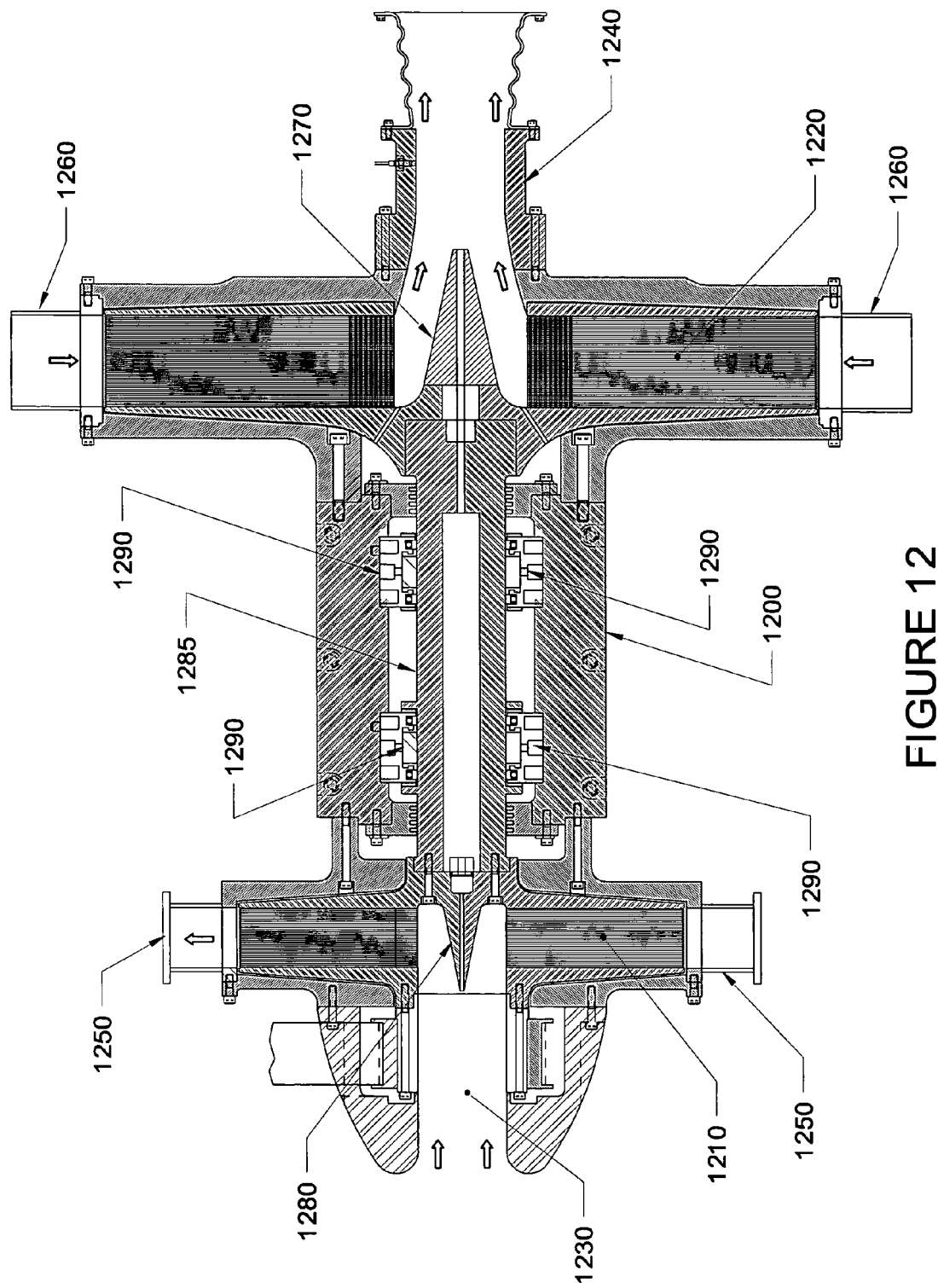
FIG. 12 is a cut away side view of the vacuum, turbine, and generator segments of the closed loop system of FIG. 11.

FIG. 12 is a cut away side view of the vacuum 1210, turbine 1220, and generator 1200 segments of the closed loop system of FIG. 11. In the embodiment illustrated in FIG. 12, a pressurized gas enters inlet ports 1260 and strikes turbine discs 1220, causing them to rotate. The gas continues on a spiral path to the center of the disc chamber, where it encounters exhaust cone 1270. Exhaust cone 1270 gently redirects the gas to exhaust port 1240. This is advantageous over the prior art as it provides a controlled means by which the gas exits the disc pack. In the prior art disc packs, a shaft extended through the entire disc pack, and air ventilating from the discs would encounter the shaft. This induced uneven airflow, which in turn placed unnecessary stress on different portions of the disc pack. By controlling the flow of gas from the disc pack a less stressful environment is created, thereby extending the life cycle of the disc pack, and increasing the flow rate at which material can flow through the disc pack, further increasing both power and efficiency.

Figure 16:
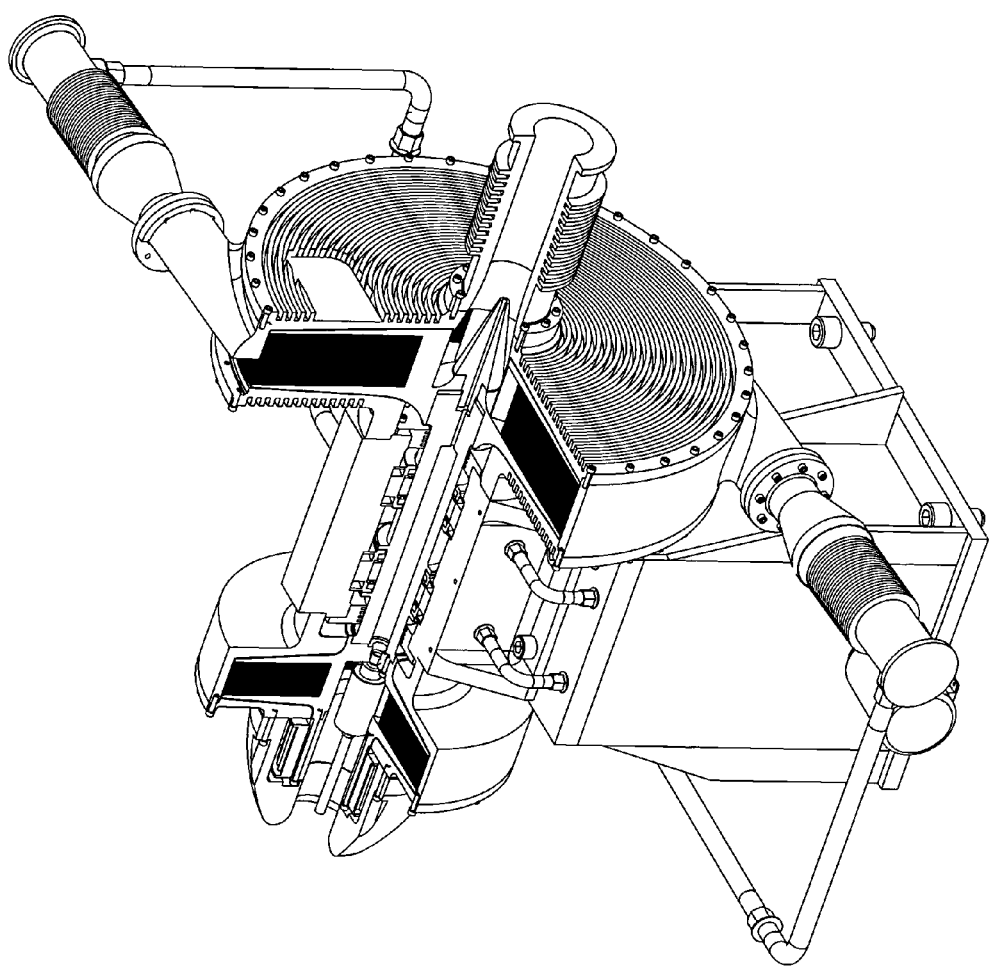
FIG. 16 is a cut-away right-hand perspective view of a closed loop system similar to that illustrated in FIG. 11.

In a closed loop system, such as that of FIG. 11, the exhaust from exhaust port 1240 flows through a condenser or other cooling means, and is then fed back into inlet port 1230. The gas is drawn into inlet port 1230, across vacuum stage cone 1280, which gently redirects the gas across vacuum stage discs 1210, and into vacuum stage outlet ports 1250. The gas is drawn into inlet port 1230 due to the rotation of discs 1210. Discs 1210 and discs 1220 are both preferably connected to shaft 1285, and when discs 1220 rotate, this causes shaft 1280 and discs 1210 to rotate as well. Generator 1200 preferably supports shaft 1285 using Barden bearings 1290 or other low-friction support means. FIG. 13 is a cut-away front perspective view of a closed loop system similar to that illustrated in FIG. 11. FIG. 14 is a cut-away left-hand perspective view of a closed loop system similar to that illustrated in FIG. 11. FIG. 15 is a close-up view of the vacuum and generator stages illustrated in FIG. 14. FIG. 16 is a cut-away right-hand perspective view of a closed loop system similar to that illustrated in FIG. 11.

Figure 17:
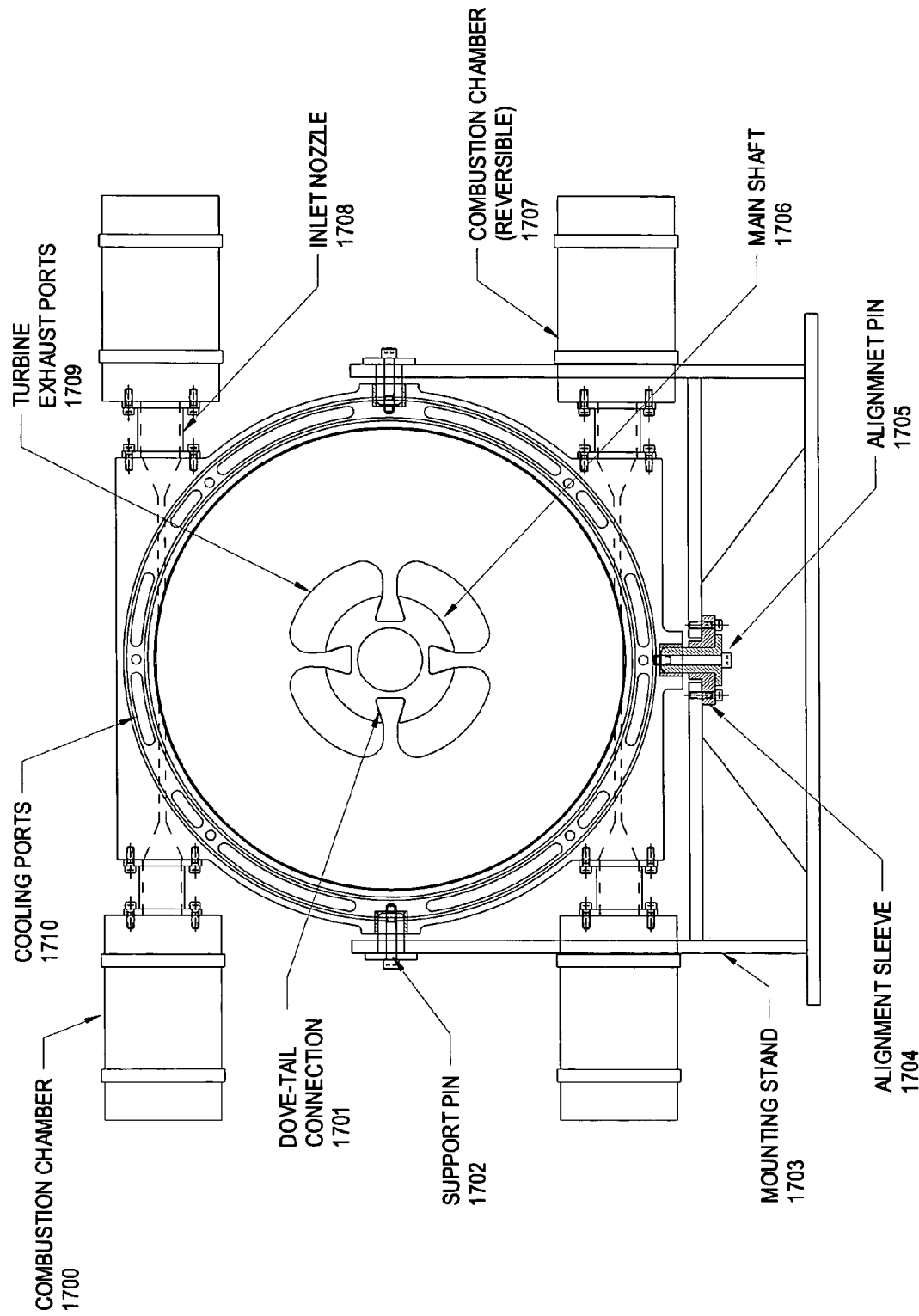
FIG. 17 is an illustration of a front view of a compact, multi-stage engine which has been mounted using a preferred mounting technique.

FIG. 17 illustrates a front view of the present invention which illustrates a unique disk mounting means utilized in a preferred embodiment of the present invention. Mounting the disks using mounting stand 1703 and support pins 1702 allows the engine to be disassembled in a vertical state by allowing the turbine housing to pivot around support pins 1702 until it is in a horizontal orientation. Such disassembly eliminates split case flanges and reduces the time it takes to disassemble the engine.

In addition, FIG. 17 illustrates an external combustion chamber configuration capable of operating the turbine in either direction. The embodiment illustrated in FIG. 17 also allows thermal expansion to happen along the centerline of the engine, which eliminates the need to realign the engine with the generator as the temperature changes.

FIG. 17 also illustrates the preferred use of cooling ports 1710 in turbine housing 1711. Cooling ports on the housing can enhance the closed loop cycle such that after being condensed in the engine, the gas or other fluids will pass through these passages to recover waste heat from the casing. This arrangement can increase engine efficiency and help cool the engine case.

Figure 18:
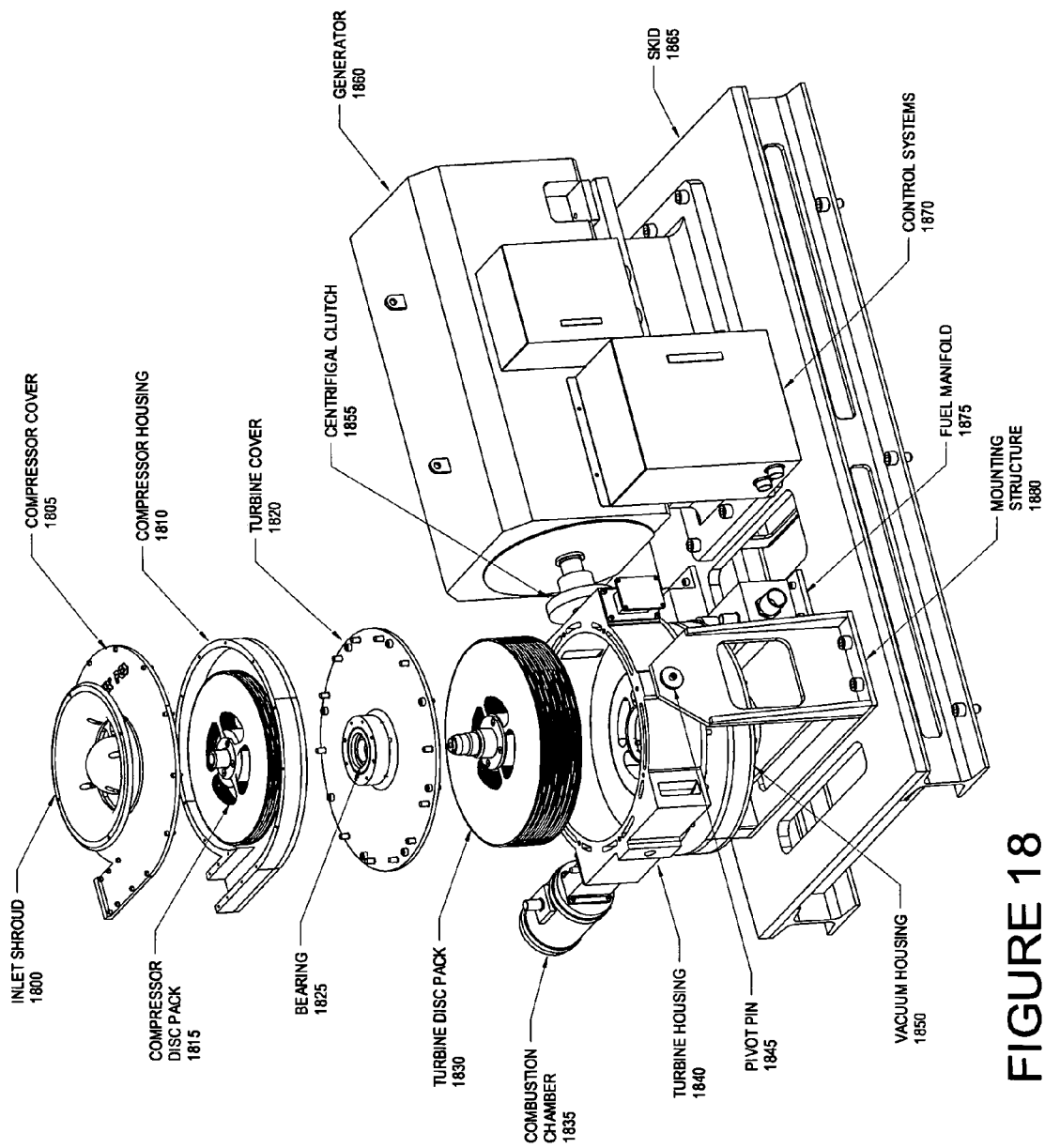
FIG. 18 is an exploded perspective view of the multi-stage engine and mounting technique of FIG. 17.

FIG. 18 is an illustration of assembly/disassembly of the turbine with the turbine housing in a horizontal arrangement as described above with respect to FIG. 17. Allowing the engine to be disassembled while horizontal reduces assembly/disassembly time and makes for easy removal/installation of critical components. FIG. 18 also illustrates a mounting technique which can allow for thermal expansion via the centerline of the engine.

The technique of rotating the main case via a set of pivot pins allows for easy removal of critical components and eliminates the need for realignment of the turbine once it is reassembled. This technique also reduces inspection and major servicing time and reduces the risk due to rotor removal, as typically experienced using a cradle removal type process. The mounting technique also allows for thermal expansion of the engine to occur along the centerline of the engine, i.e. along the rotor shaft, which in turn eliminates unwanted vibration which may be induced due to different expansion characteristics of individual components.

The power generation system also incorporates water-cooling to cool the external housing. This may be provided in a closed loop configuration such that the condensed fluids are passed to the housing to act as a pre-heater. The already pre-heated fluid makes its way to the heat exchanger where its finally heating phase takes place prior to being injected into the turbine.

Figure 19:
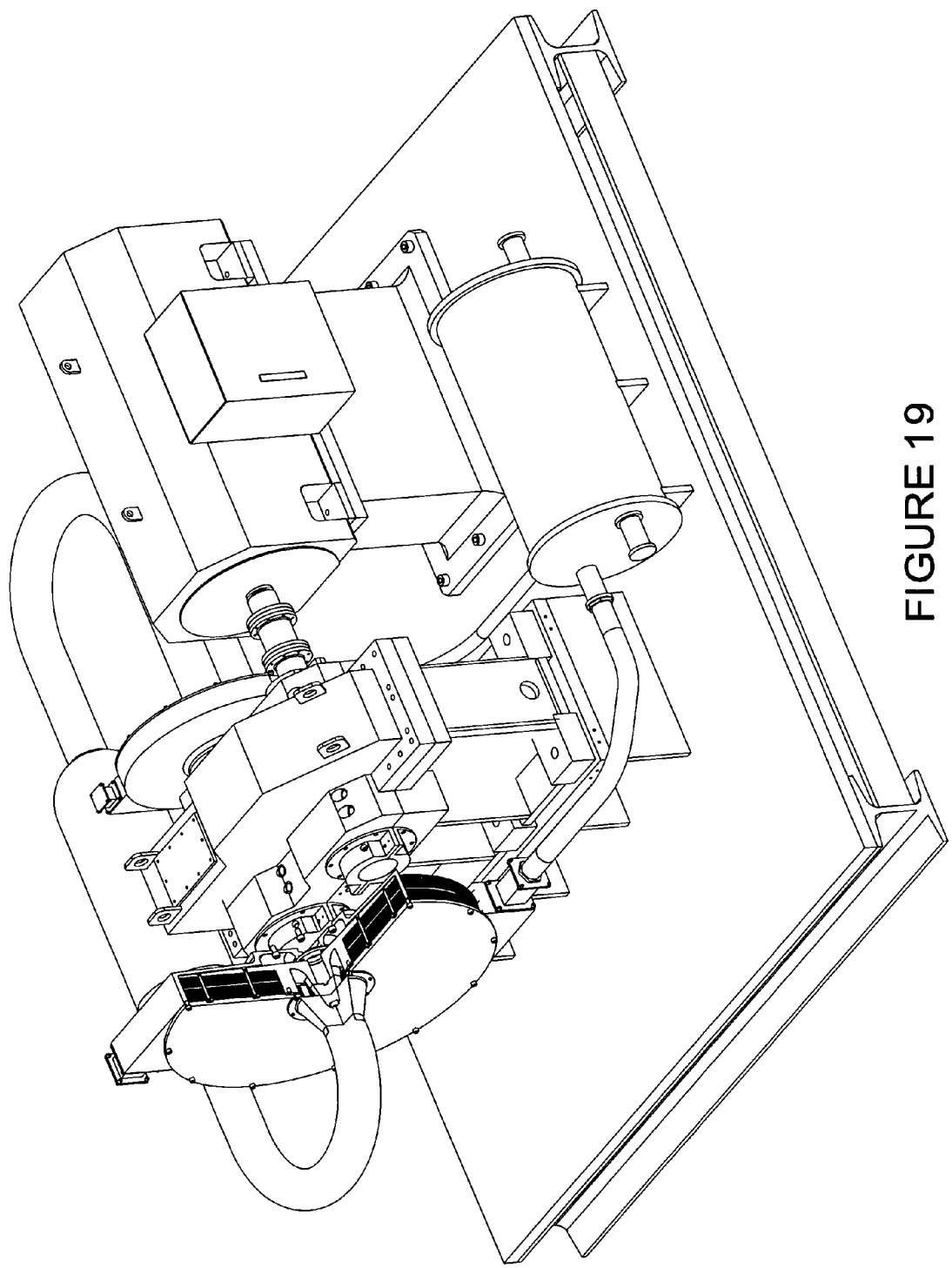
FIG. 19 is a front perspective view of an assembled version of the multi-stage engine illustrated in FIGS. 17 and 18.
Figure 20:
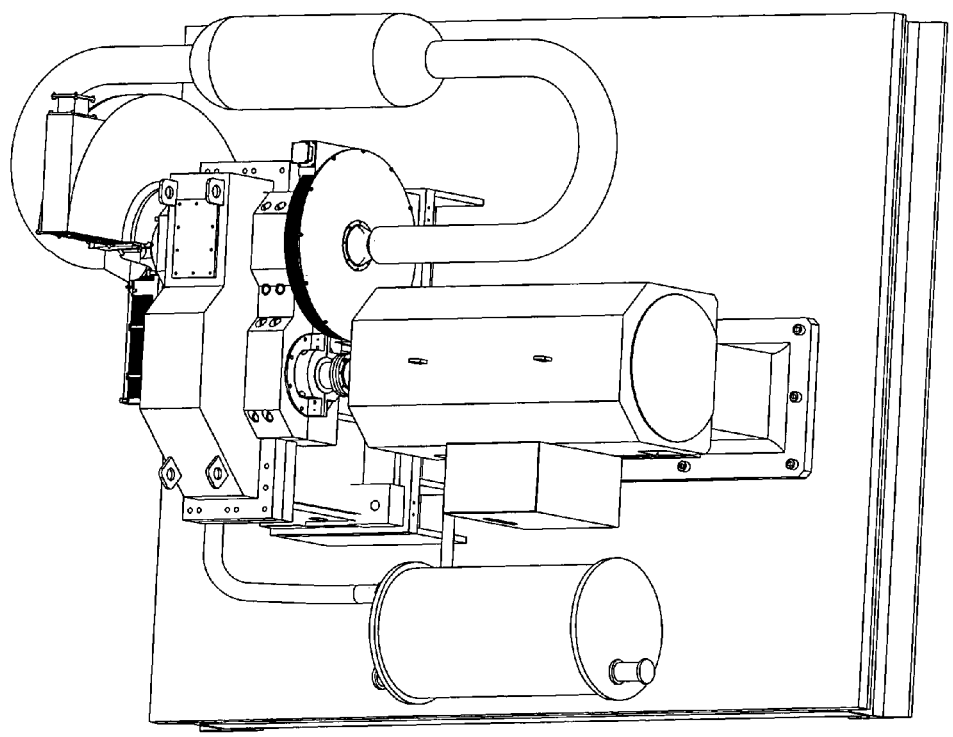
FIG. 20 is a top perspective view of an assembled version of the multi-stage engine illustrated in FIGS. 17 and 18.
Figure 21:
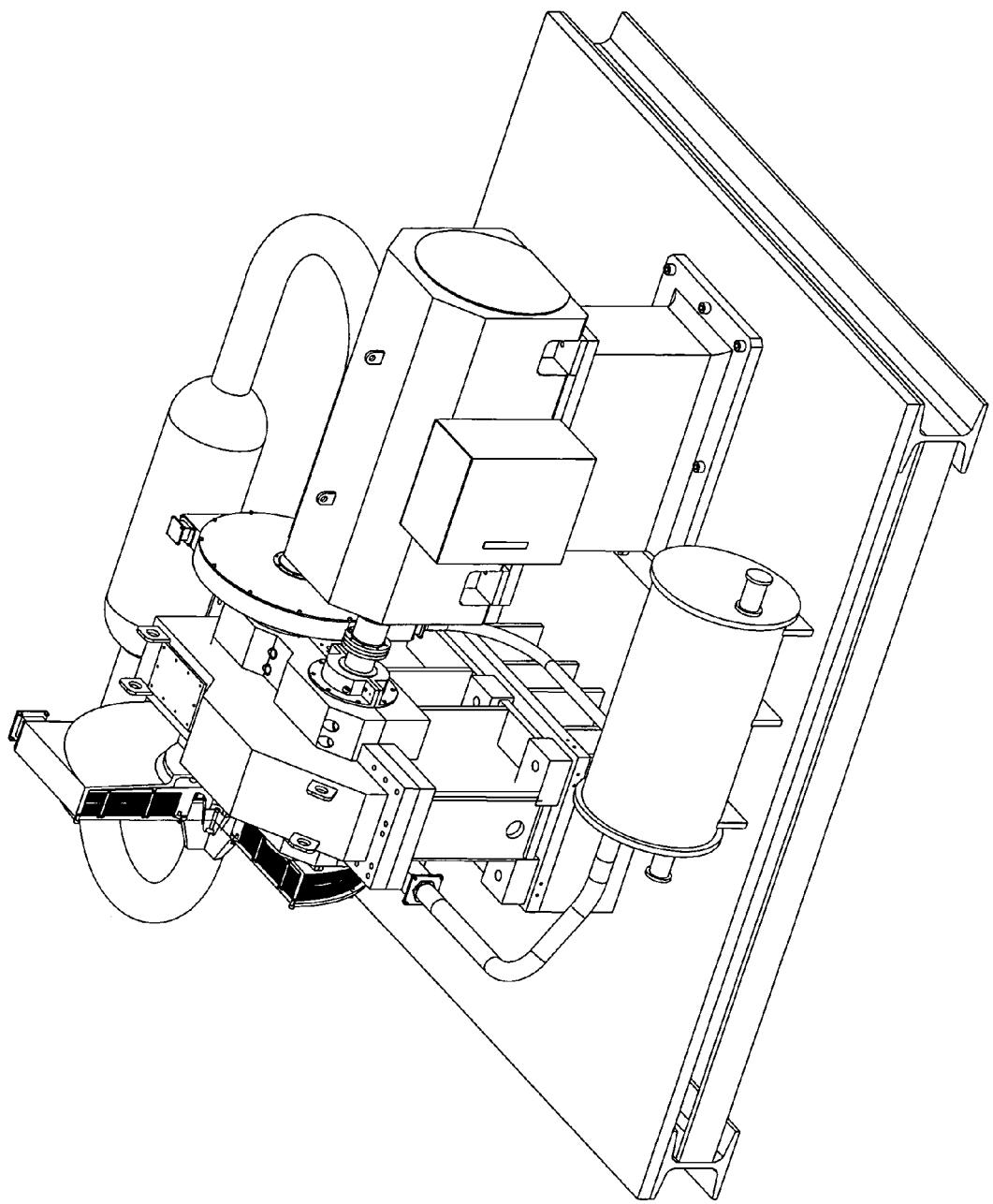
FIG. 21 is an alternative front perspective view of an assembled version of the multi-stage engine illustrated in FIGS. 17 and 18.

FIG. 18 further illustrates a compact compressor stage 1810/turbine stage 1840/vacuum stage 1850 embodiment capable of driving generator 1860. This embodiment has the advantage of placing all of the engine components in a smaller space, thereby reducing the overall physical requirements of the present invention. FIG. 19 is a front perspective view of an assembled version of the multi-stage engine illustrated in FIGS. 17 and 18. FIG. 20 is a top perspective view of an assembled version of the multi-stage engine illustrated in FIGS. 17 and 18. FIG. 21 is an alternative front perspective view of an assembled version of the multi-stage engine illustrated in FIGS. 17 and 18.

Figure 22:
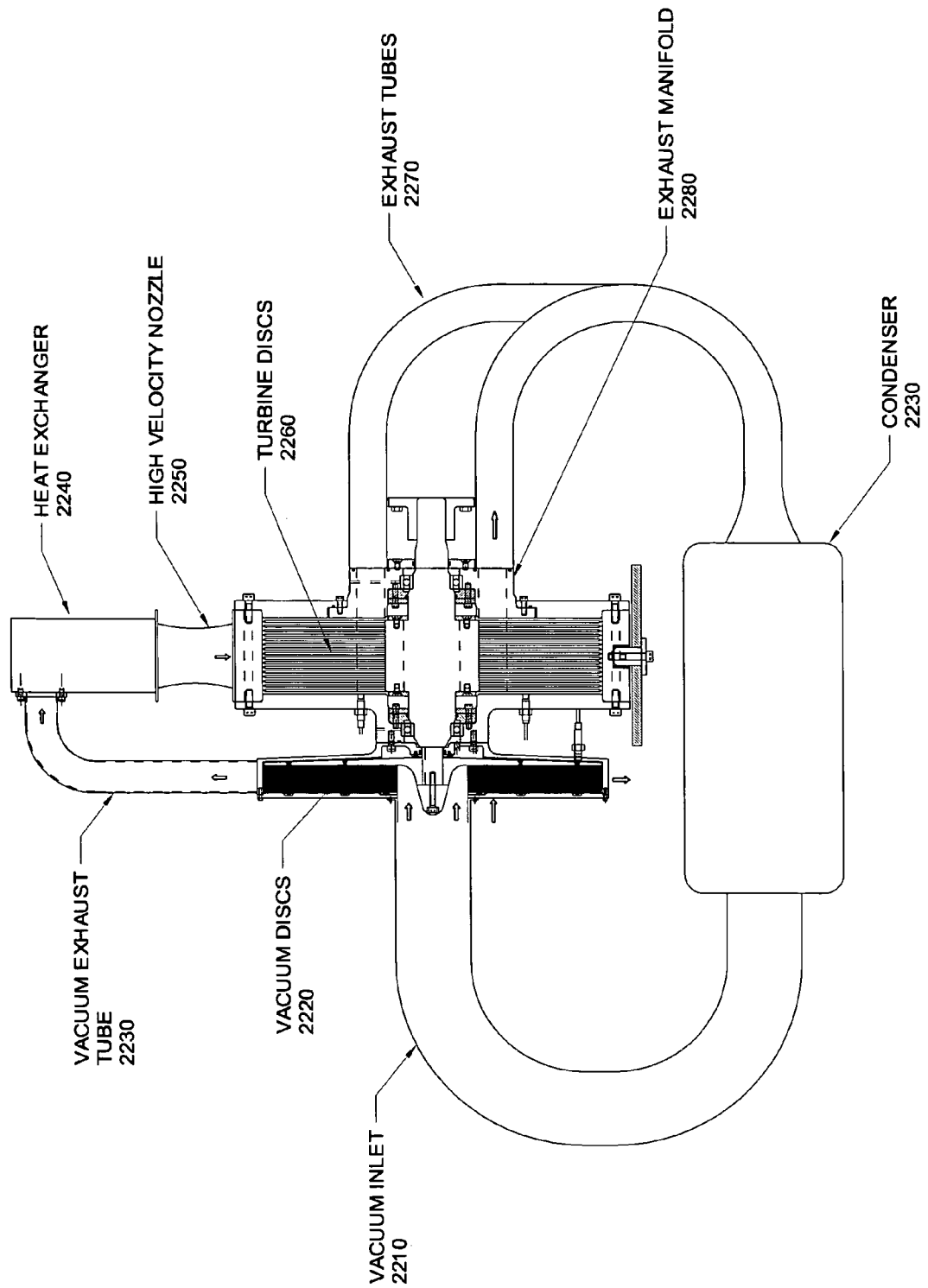
FIG. 22 is a cut-away view of a two-stage engine embodiment of the present invention.

FIG. 22 is an illustration of a closed loop system in which the turbine and vacuum stages operate on a single shaft 2290. The configuration preferably uses an internal dovetail configuration for turbine discs 2260 and an external dovetail configuration for vacuum discs 2220. The turbine is fed from a heat exchanger 2240 and ultimately exhausts to a condenser 2230 through exhaust manifolds 2280 and exhaust tubes 2270. The vacuum stage 2220 pulls gas or fluid from condenser 2230, which is compressed and fed into heat exchanger 2240 in the closed loop configuration.

Figure 23:
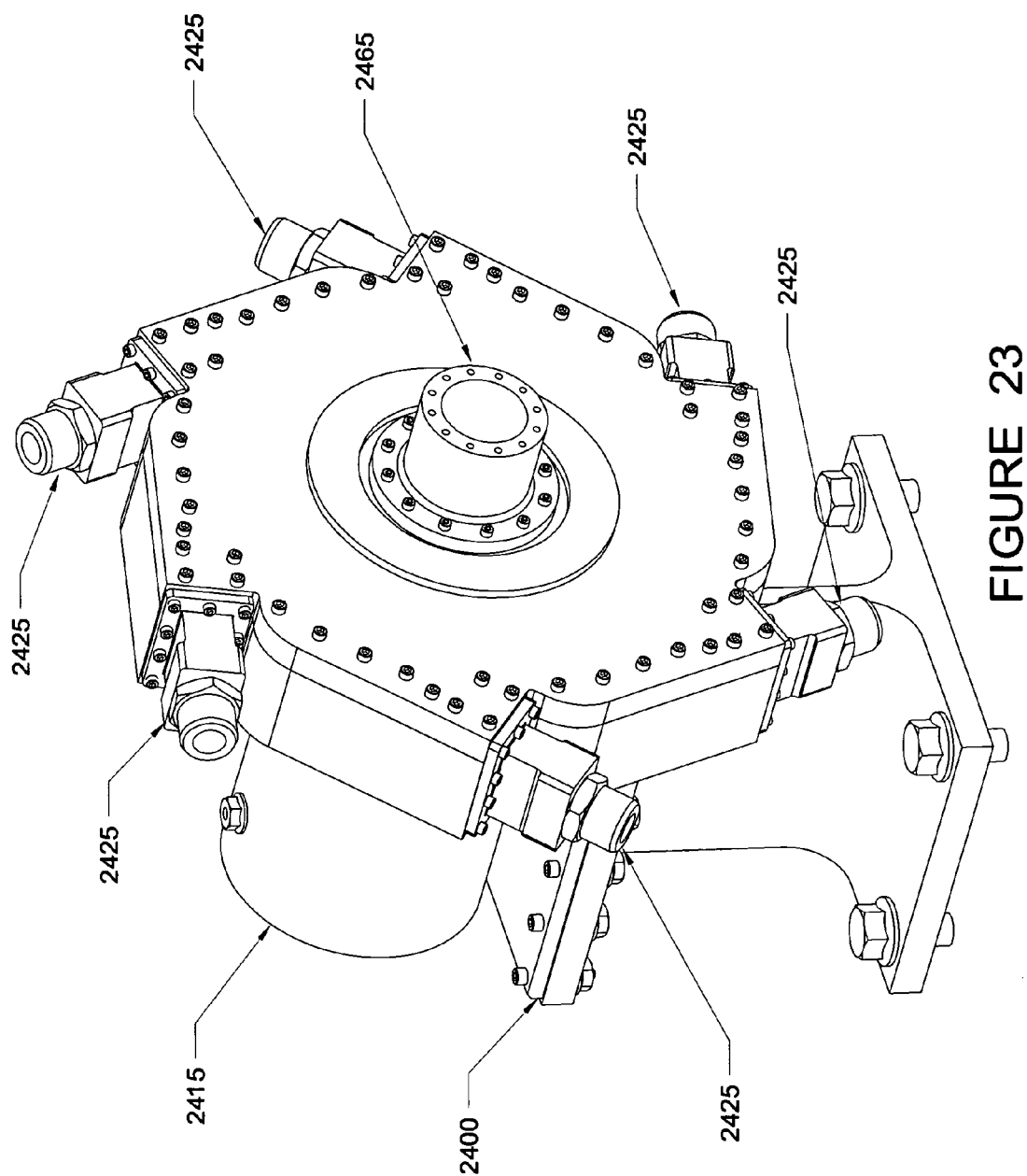
FIG. 23 is a perspective view of an assembled, multi-input port, single-stage engine.

FIG. 23 is a perspective view of an assembled, multi-input port, single-stage engine. FIGS. 23 through 32 are related, and corresponding components are similarly labeled throughout the figures to facilitate understanding and identifying aspects of the invention. The embodiment illustrated in FIGS. 23 through 32 uses multiple input ports 2425 to power generator 2415, which is preferably mounted to a sturdy stand 2400. Gas entering input ports 2425 is preferably ventilated through exhaust port 2465.

Figure 24:
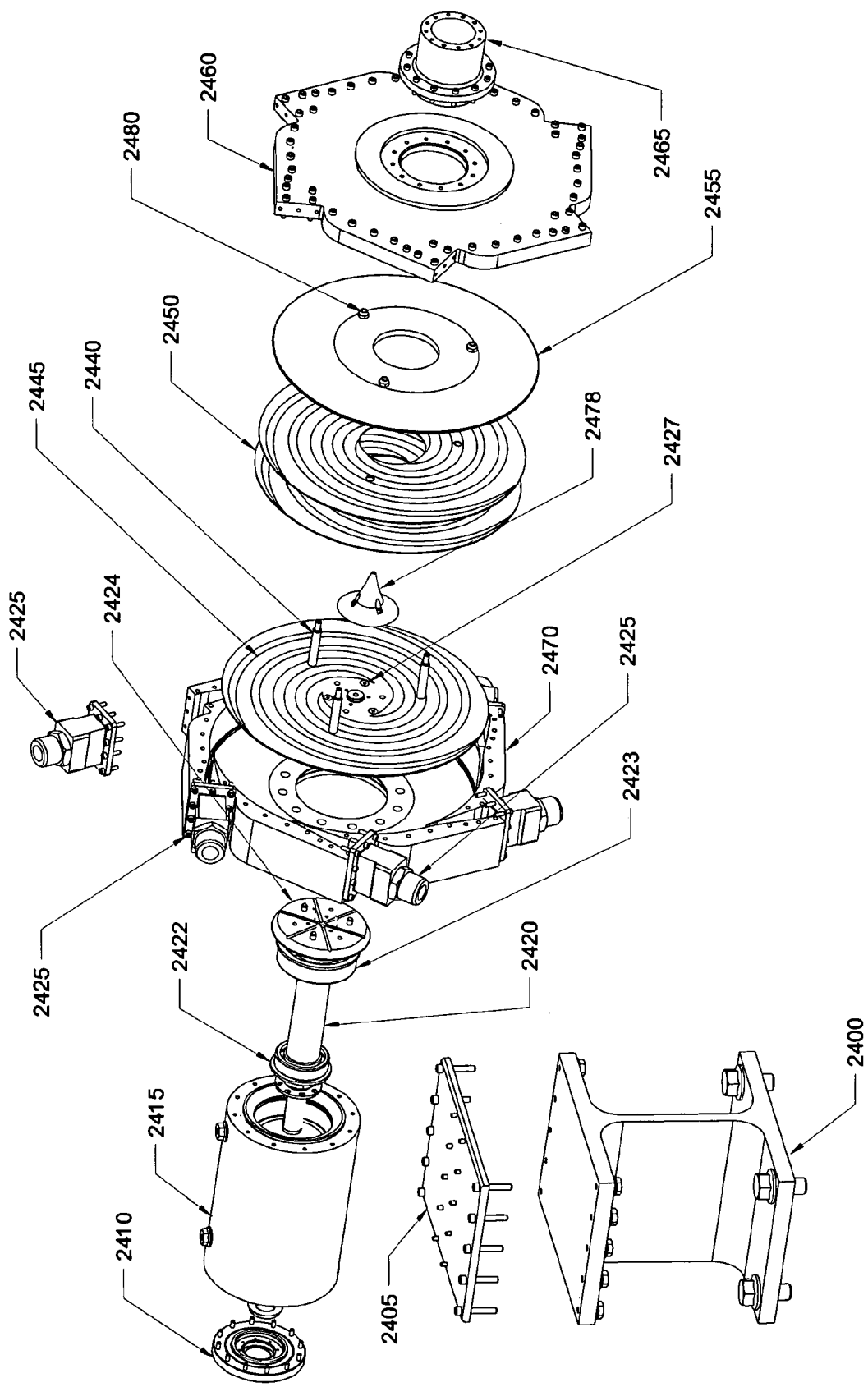
FIG. 24 is an exploded view of the engine illustrated in FIG. 23.

FIG. 24 is an exploded view of the engine illustrated in FIG. 23. As FIG. 24 illustrates, main shaft 2420 is preferably housed within generator 2415, and is supported by at least one high-speed, low friction bearings. Generator 2415 preferably mounts to stand 2400 through a rubber mat 2405, to help reduce vibrations. While a rubber mat is presently preferred, it should be apparent to one skilled in the art that other vibration reduction means, including, but not limited to, attaching generator 2415 directly to stand 2400, may be substituted therefor without departing from the spirit or the scope of the invention.

Shaft 2420 preferably attaches to the disc pack through mounting bracket 2424. Generator 2415 is preferably otherwise isolated from the disc pack and the related heat and high-pressure gases through the use of a seal 2423. Because mounting bracket 2424 will rotate at high speeds, mounting bracket 2424 preferably includes a plurality of vacuum notches 2426, to help alleviate the vacuum that would otherwise build up between mounting bracket 2424, rotor case 2430, and support plate 2435. Support plate 2435 preferably contains a plurality of vacuum release holes 2447 which preferably align with vacuum notches 2426, providing a path through which the vacuum may be relieved. Exhaust cone 2475 can further assist in the relief of the vacuum pressure. As illustrated in other figures, including FIGS. 33 through 39, exhaust cone 2475 preferably includes a ventilation tube through which air or other gases may pass from vacuum release holes 2447 to exhaust port 2465.

Support plate 2435 also preferably includes a plurality of disc support posts 2440, dovetail adapters, or the like. As will be described below with respect to FIG. 30, support posts 2440, or the corresponding dovetail or other adapters, also preferably contain ventilation tubes. Discs 2450 can be attached to support plate 2435 by sliding them onto support posts 2440. A retaining ring 2455 is then preferably placed over discs 2450 and mated with support plate 2435 through attachment means 2480. Attachment means 2480 is preferably open to allow support posts 2440 to properly ventilate. Support plate 2435, discs 2450, and retaining ring 2455 are preferably encased within rotor case 2430, which is in turn sealed by attaching rotor case plate 2460 to the outside of the rotor case 2430.

In the embodiment illustrated in FIG. 24, gas enters rotor case 2430 through inlet ports 2425, interacts with plates 2450, and exits through 2465. The interaction of the gas and plates 2450 causes shaft 2420 to rotate, generating power though generator 2415.

Figure 25:
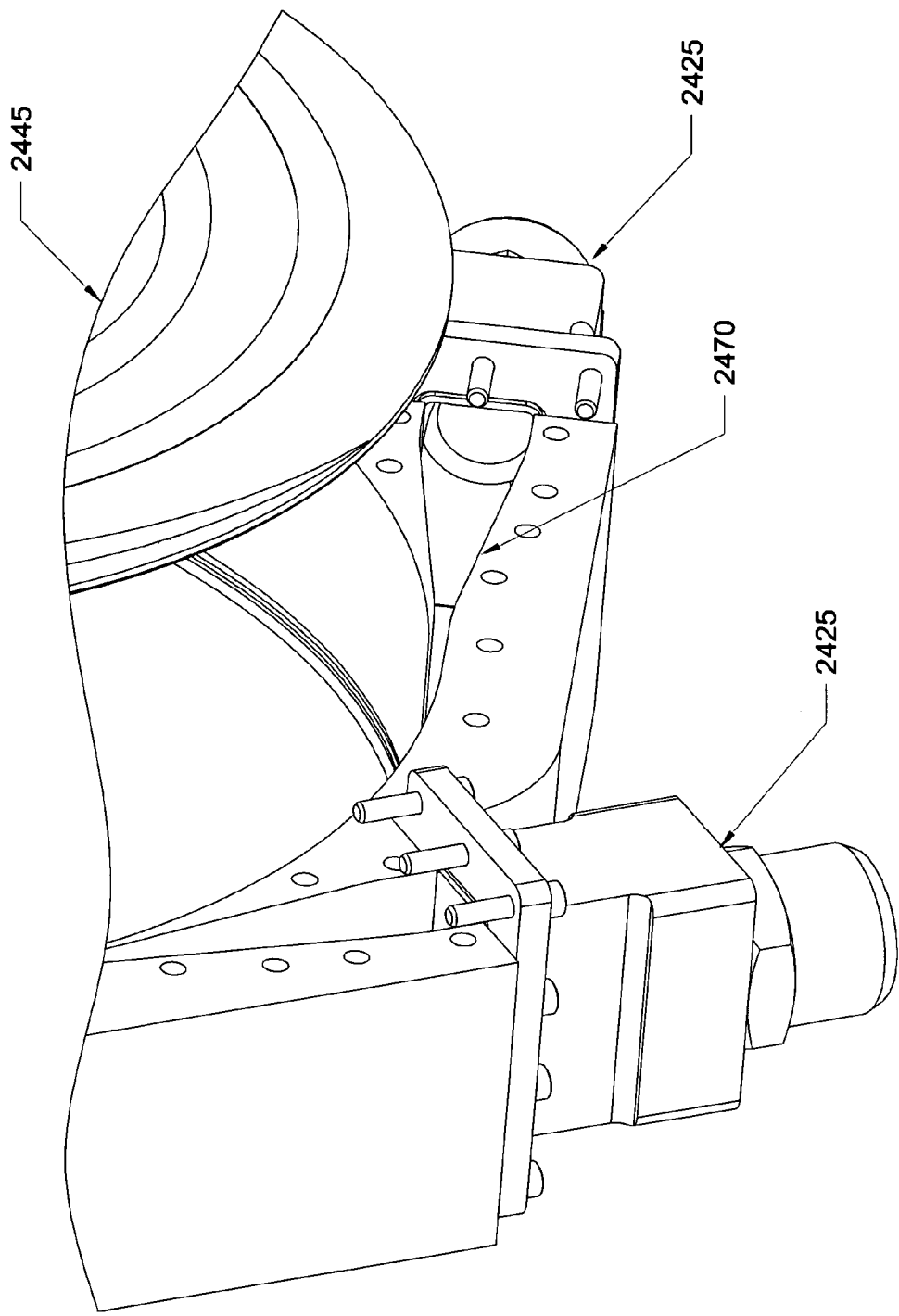
FIG. 25 is a close-up of an input port and mounting means employed in the engine illustrated in FIG. 23.
Figure 26:
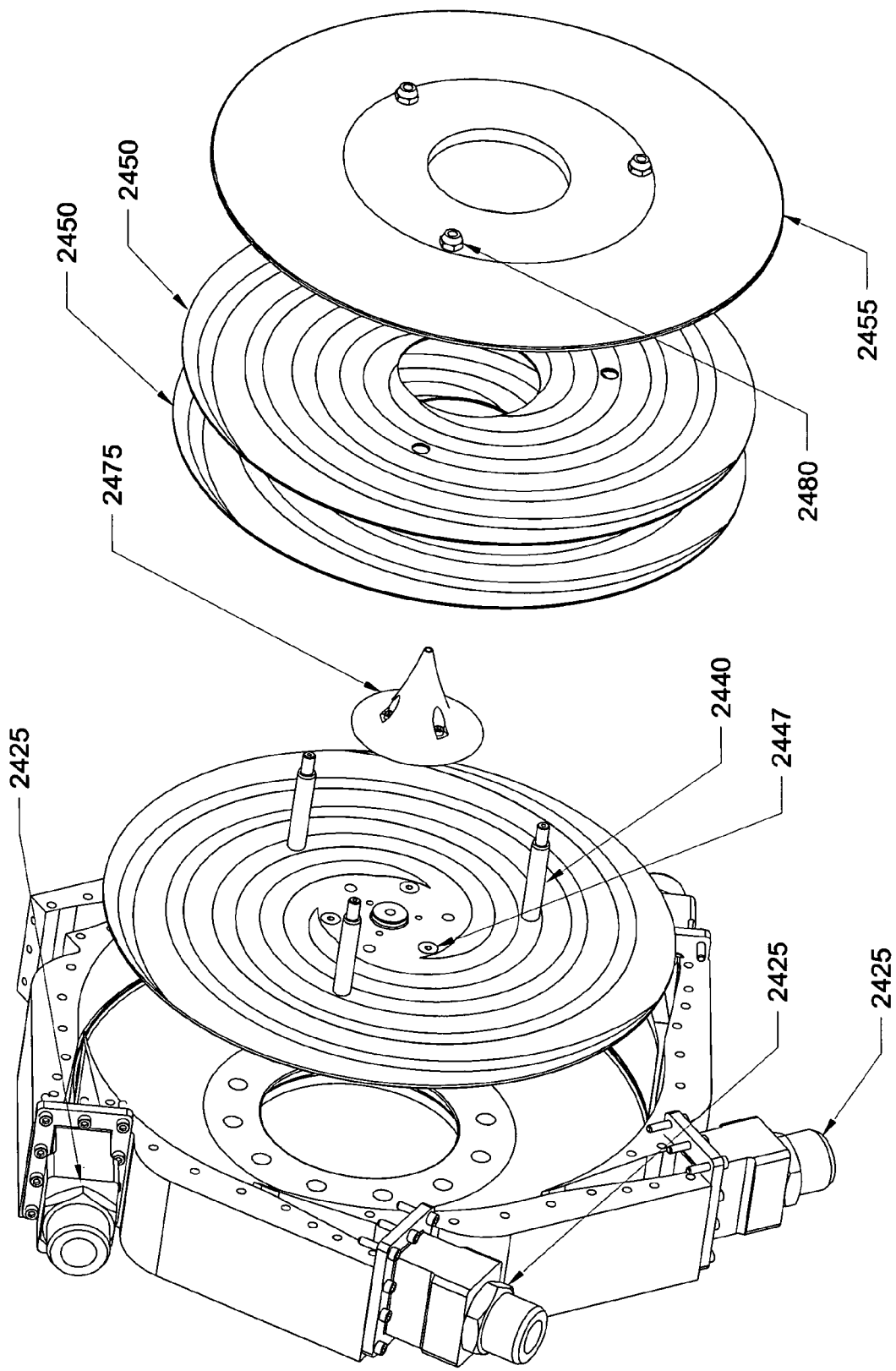
FIG. 26 is a close-up of the support disc, exhaust cone, mounting pins, and discs of the engine illustrated in FIG. 23.
Figure 27:
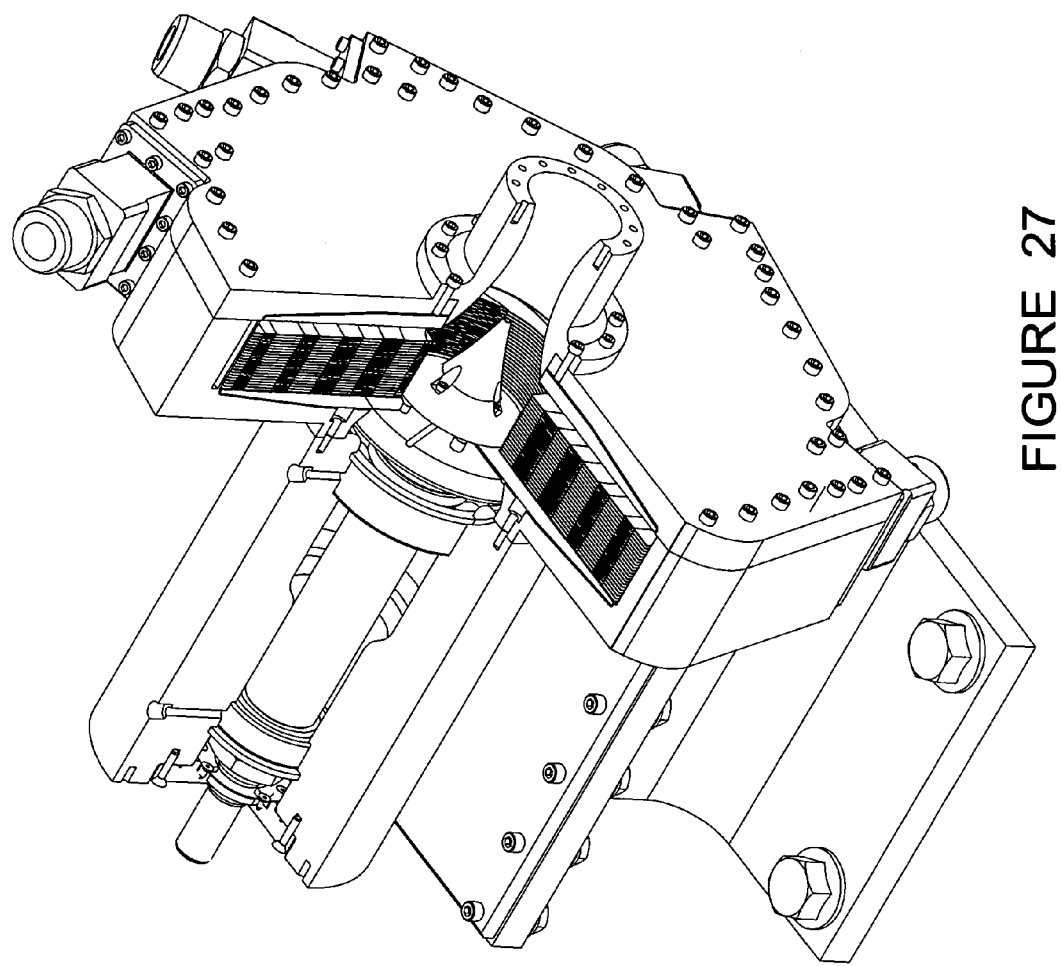
FIG. 27 is a cut-away perspective view of the engine illustrated in FIG. 23.
Figure 28:
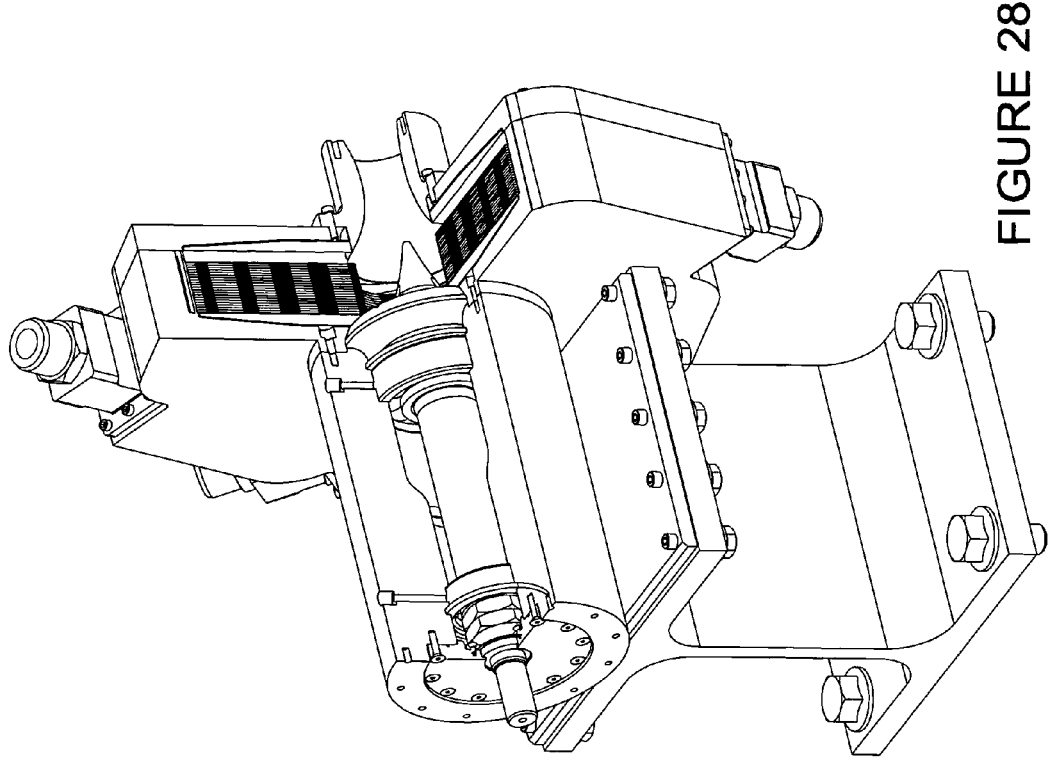
FIG. 28 is a close-up view of portions of FIG. 23.
Figure 29:
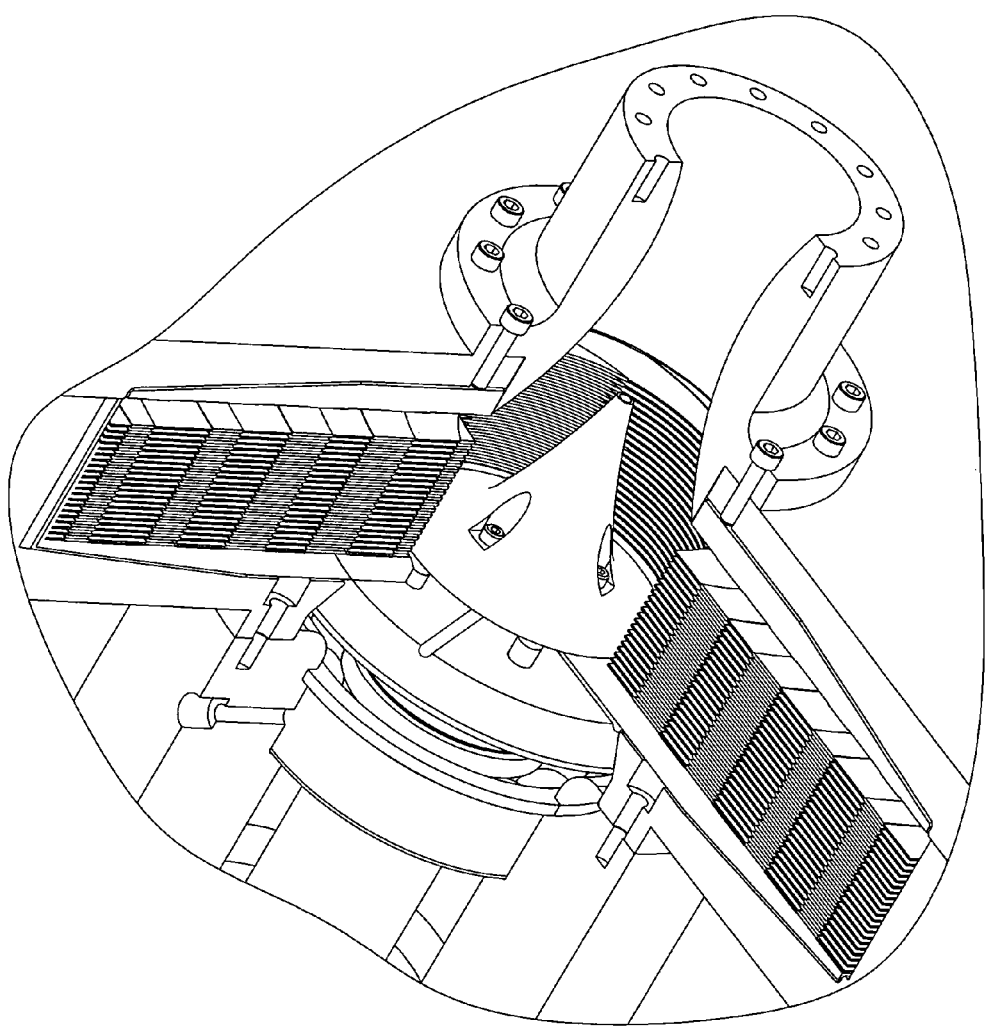
FIG. 29 is a still closer view of portions of FIG. 23.

FIG. 25 is a close-up of an input port 2425, flow nozzle 2470, and input port mounting means employed in the engine illustrated in FIG. 23. FIG. 26 is a close-up of support plate 2435, vacuum release holes 2447, exhaust cone 2475, mounting pins 2440 and their ventilation tubes, discs 2450, locking ring 2455, and mounting means 2480 of the engine illustrated in FIG. 23. FIG. 27 is a cut-away perspective view of the engine illustrated in FIG. 23. FIG. 28 is a close-up view of portions of FIG. 23. FIG. 29 is a still closer view of portions of FIG. 23, and provides a clear view of the ventilation tube preferably encased within exhaust cone 2475.

Figure 30:
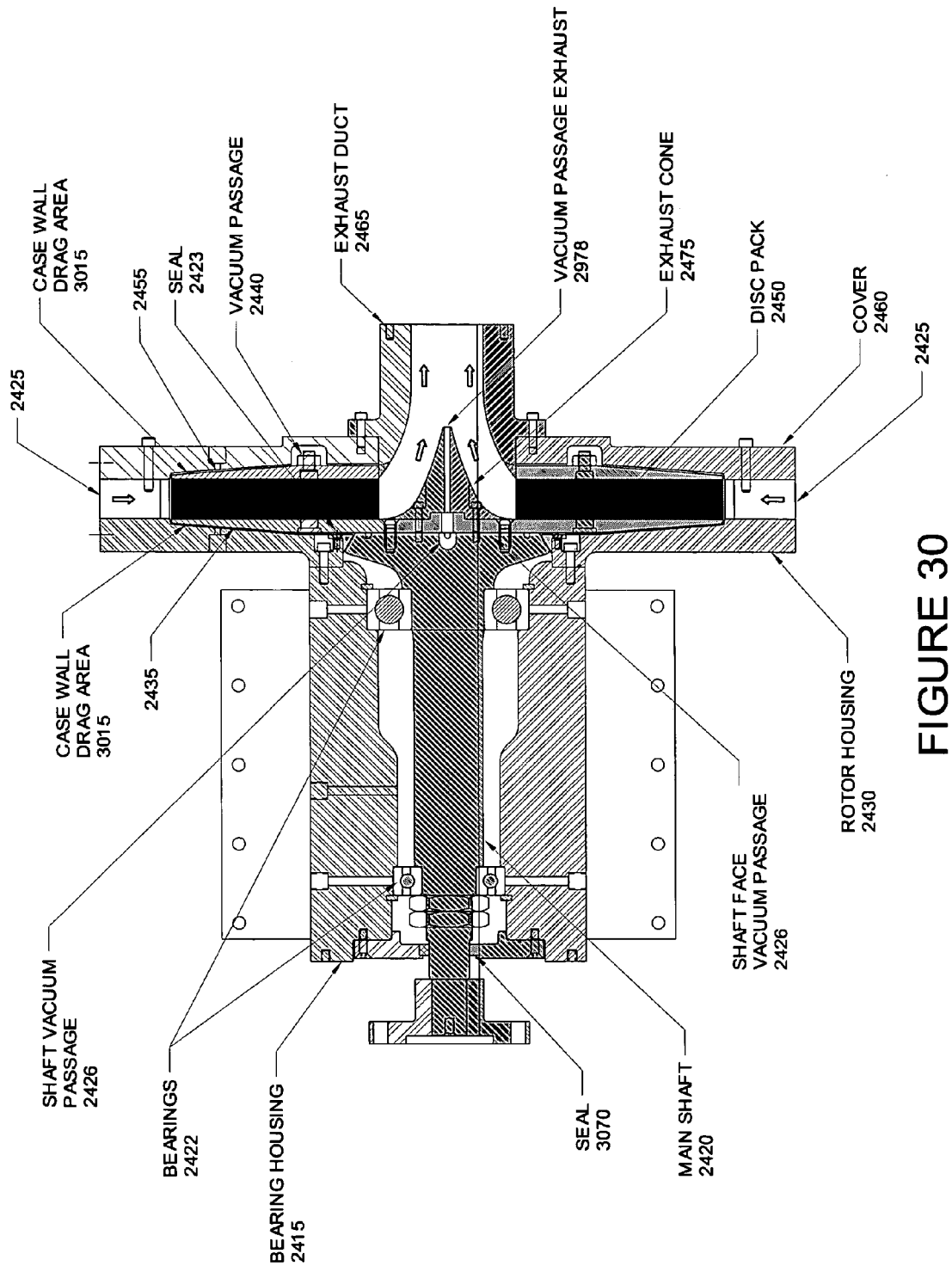
FIG. 30 is a cut-away view of the engine of FIG. 23.

FIG. 30 is a detailed engineering schematic of the engine of FIG. 23. As support plate 2435 and retaining ring 2455 rotate, a vacuum, and corresponding drag, may be crated between them and rotor housing 2430. In a preferred embodiment, the vacuum passages 2426 are sufficiently long to facilitate relieving the vacuum created between rotor housing 2430 and support plate 2435. As described above, mounting pins 2440 preferably include ventilation tubes which allow the gap between cover 2460 and locking ring 2455 to ventilate to and through the vacuum passages 2426, and out through vacuum passage exhaust 2978.

Figure 31:
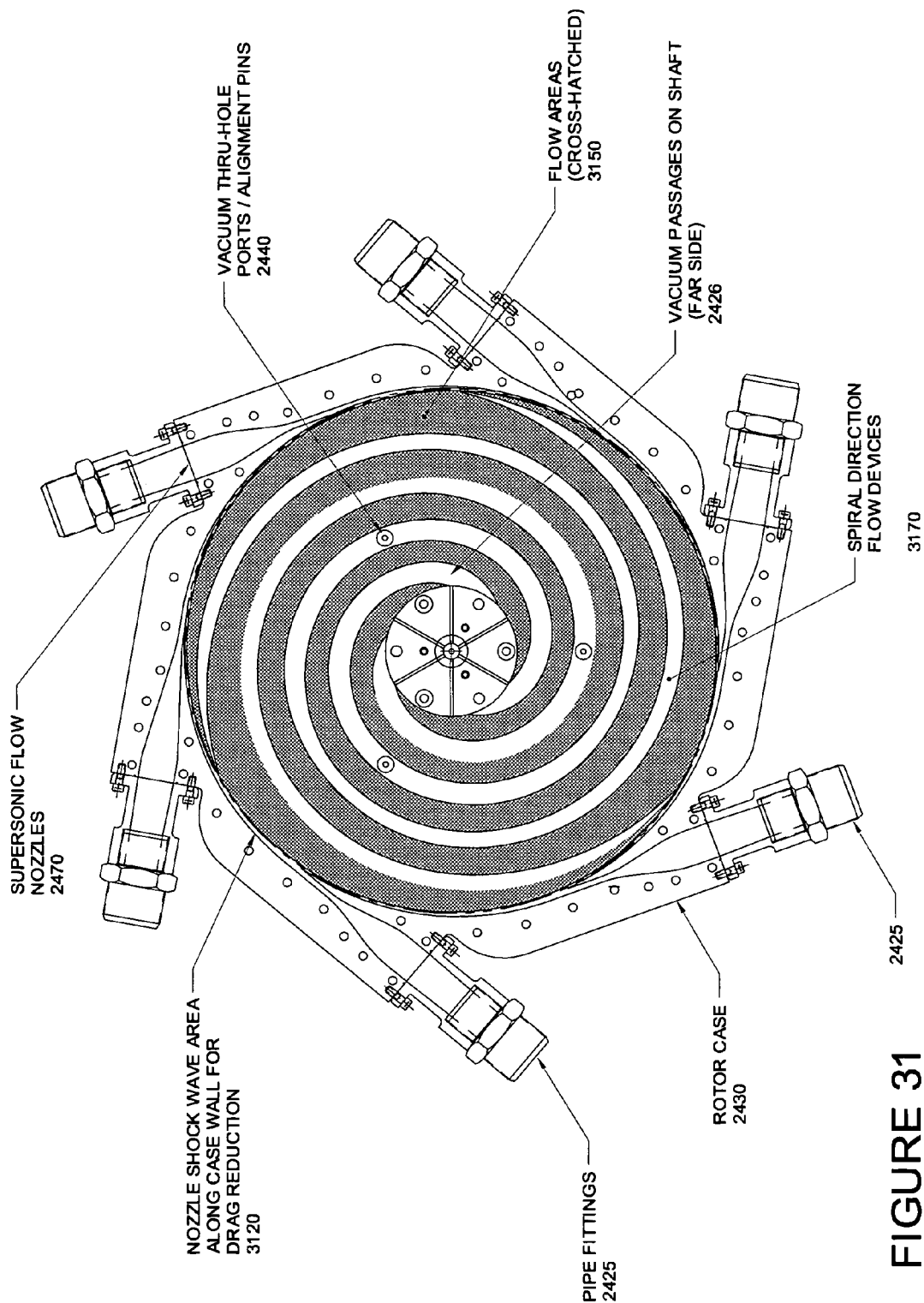
FIG. 31 is a cut-away front view of the multi-port engine illustrated in FIG. 23.

FIG. 31 is a cut-away front one possible embodiment of the multi-port engine illustrated in FIG. 23. The engine compartment illustrated in FIG. 31 is designed to operate in only a single direction, as is frequently the case in power generation systems. This embodiment utilizes multiple inlet ports 2425 to more evenly distribute the incoming gas around the circumference of the discs. The use of multiple input ports also reduces drag induced in certain regions around certain portions of the case.

The engine compartment illustrated in FIG. 31 also utilizes nozzles 2470 designed to further increase the pressure of the gas or fluid injected into the engine compartment by restricting flow to a narrow inlet. The outermost edge of nozzles 2470, which is defined by rotor case 2430, preferably gradually tapers down as it becomes the innermost edge of the following inlet port. This helps further reduce drag and allows the gas or fluid to first strike the discs substantially tangential to the surface of the discs.

Figure 32C:
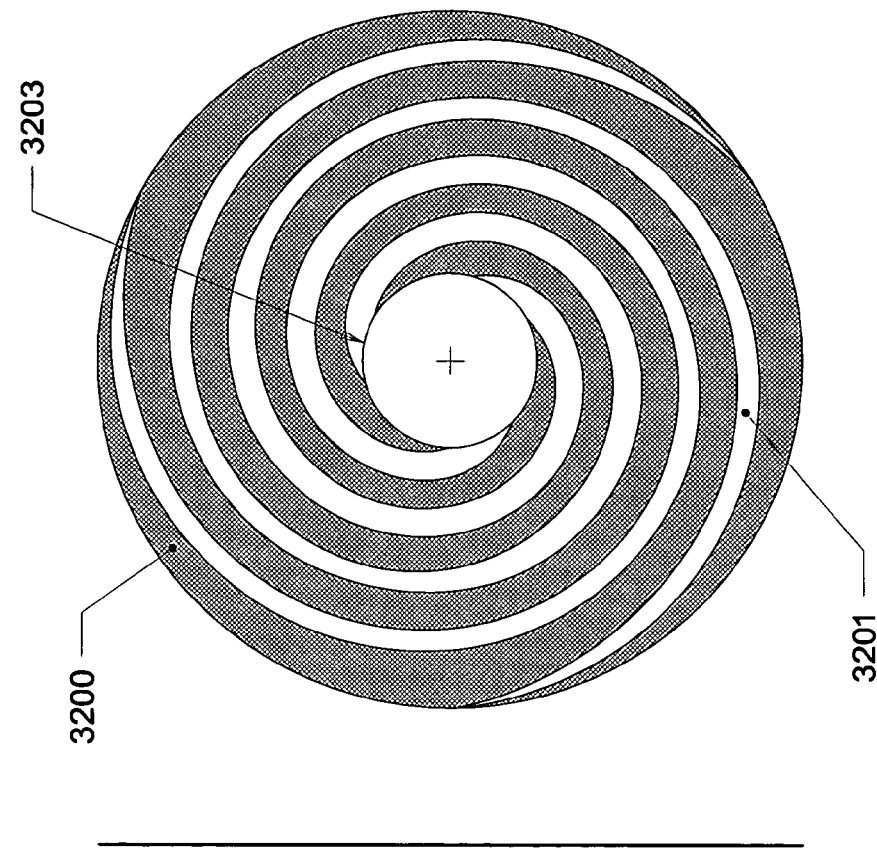
Figure 32A:
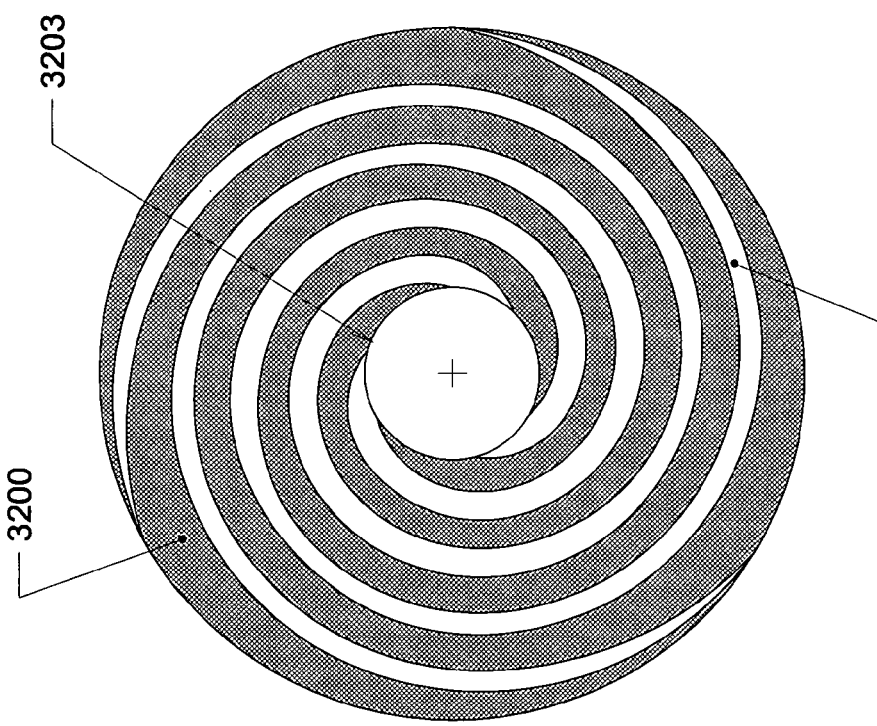

FIGS. 32a, 32b, and 32c are detailed views of the front, side, and backs, respectively, of discs preferably employed in the embodiment illustrated in FIG. 31. Coating the disks with a ceramic, composite, or nano-composite such as, but not limited to, ceramic mesoporous nanocomposites, will also provide the capability to run the rotor at much higher temperatures. This will increase overall efficiency while at the same time reducing emissions. The use of mesoporous nanocomposite ceramics will allow the cavities to be filled with materials to facilitate finer boundary layer control and to address corrosion issues.

As described above, a preferred embodiment of the present invention includes coating the discs with one or more substances to improve adhesion, serve as a catalyst, or for other purposes. FIGS. 32a and 32c illustrate a preferred coating pattern. In a preferred embodiment, the entire surface of the disc is coated with the desired substance, and the substance is subsequently etched or otherwise removed from portions of the disc surface, represented by shaded regions 3200, leaving only a bare disc surface 3201. Etching portions of the substance from the disc surface allows fine-grained tailoring of the duration the fluid or other material stays in contact with the discs. By creating the illustrated designs, the etching can also reduce or eliminate slip and effectively eliminate any centrifugal pumping effect. Centrifugal pumping effect refers to the tendency of heavier molecules to be forced to the outside of the engine chamber, opposite the preferred direction of travel. By etching the disc surfaces and allowing the discs to touch each other, channels are effectively created through which the material supplying energy to the engine can travel, yet which traps the heavier molecules within the discs, thereby reducing the likelihood that such molecules will flow opposite the desired flow direction.

With etched discs, a disc pack can be formed by placing the discs immediately next to each other. As FIGS. 32a and 32c illustrate, the discs are preferably etched with complementary flow patterns, such that the etching on each disc is approximately ½ the overall width desired for the intra-disc channel. Placing individual discs in physical proximity has the added advantages of strengthening the overall disc pack, and reducing the number of parts involved in the disc pack by eliminating the need for spacers.

The size, shape, and number of swirl patterns on a disc can be varied according to a variety of factors, including, but not limited to, the viscosity of the gas or fluid providing power to the disc pack, desired flow rates, and the like. The etched design can also improve overall turbine performance while minimizing the risk of introducing large debris into closed systems.

Figure 33:
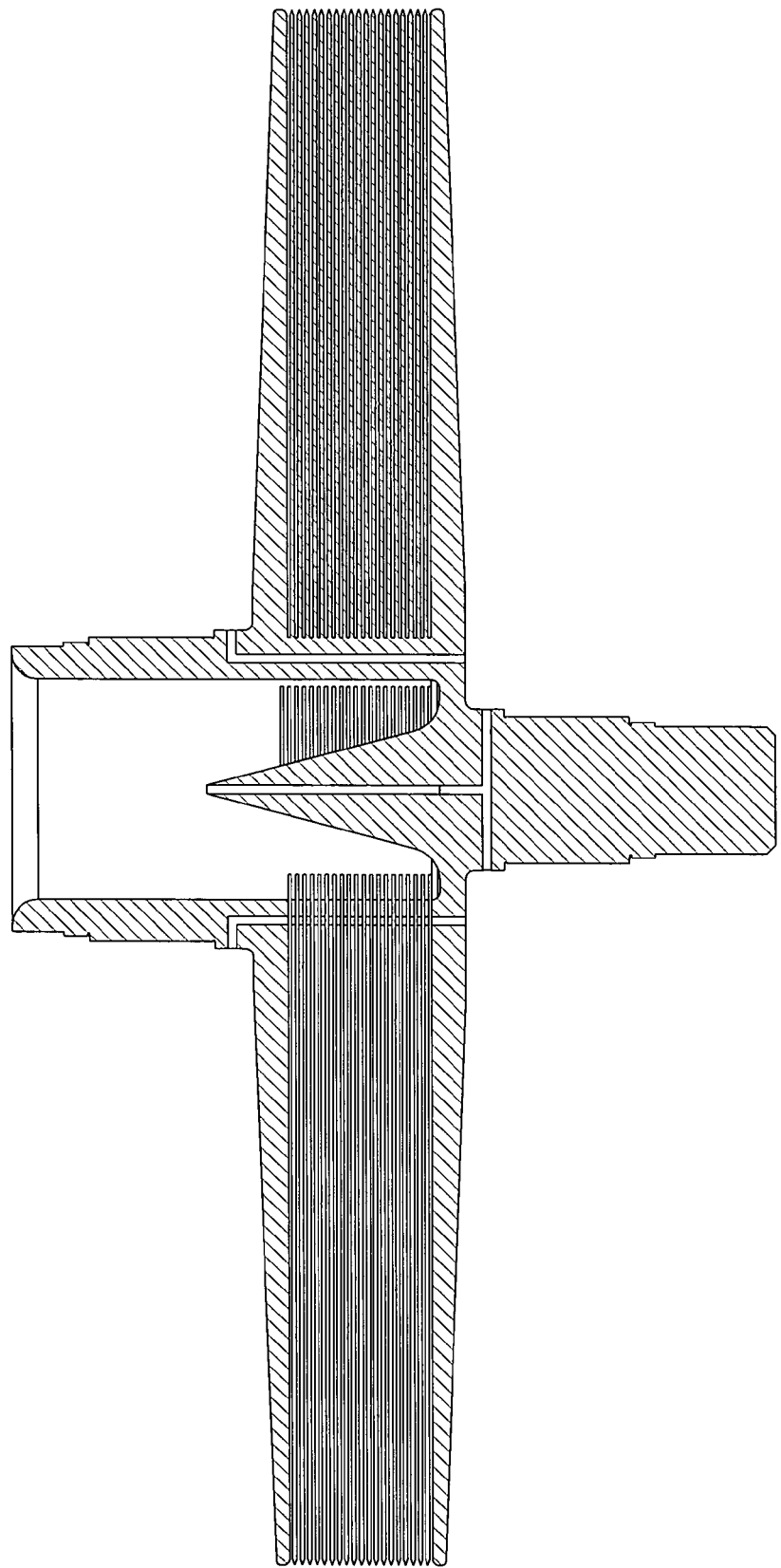
FIG. 33 is a cut-away side view of a disc pack according to an embodiment of the present invention.
Figure 34:
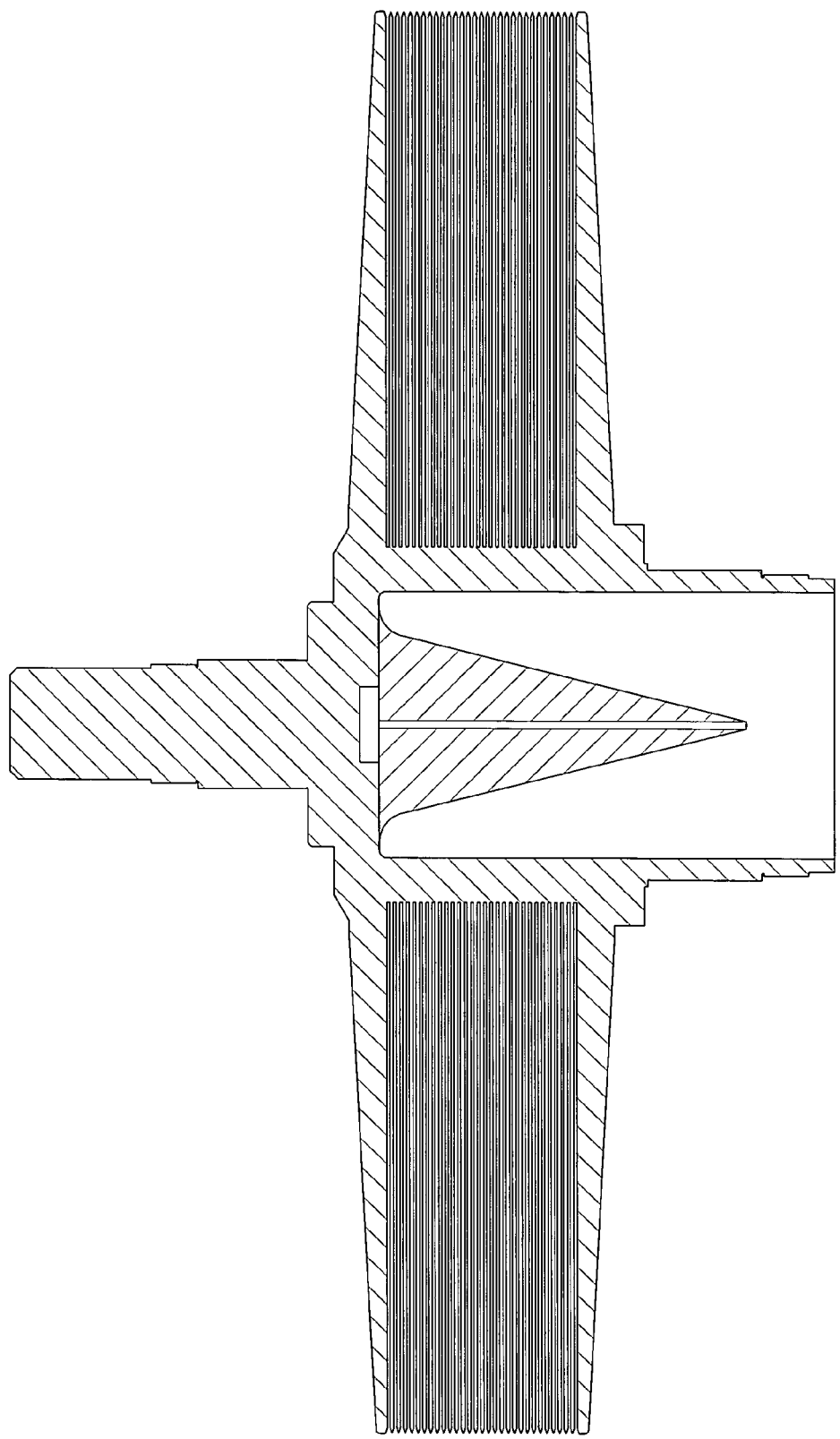
FIG. 34 is a cut-away side view of a disc pack according to an alternative embodiment of the present invention.
Figure 35:
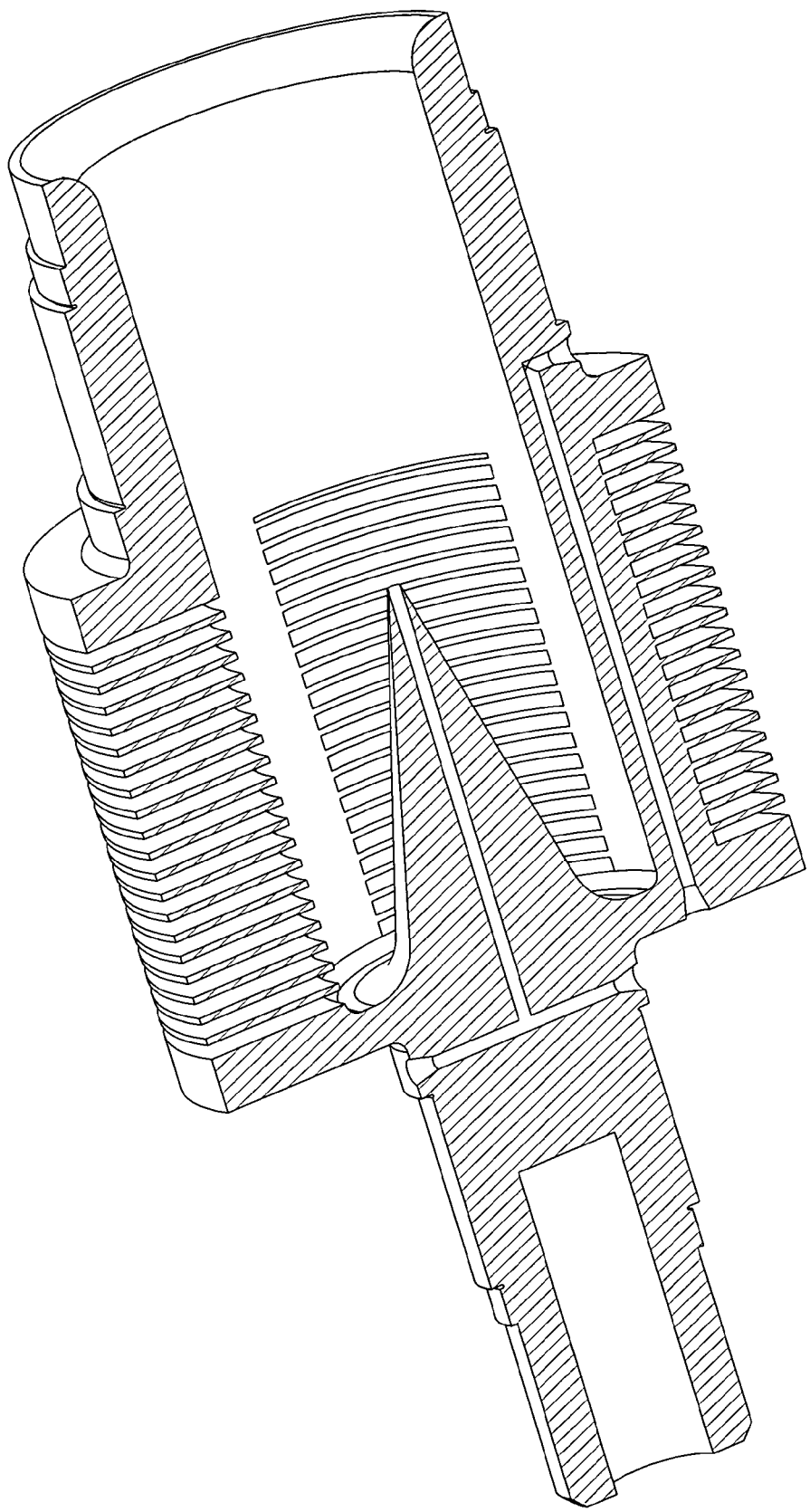
FIG. 35 is a cut-away side view of a disc pack according to another alternative embodiment of the present invention.
Figure 36:
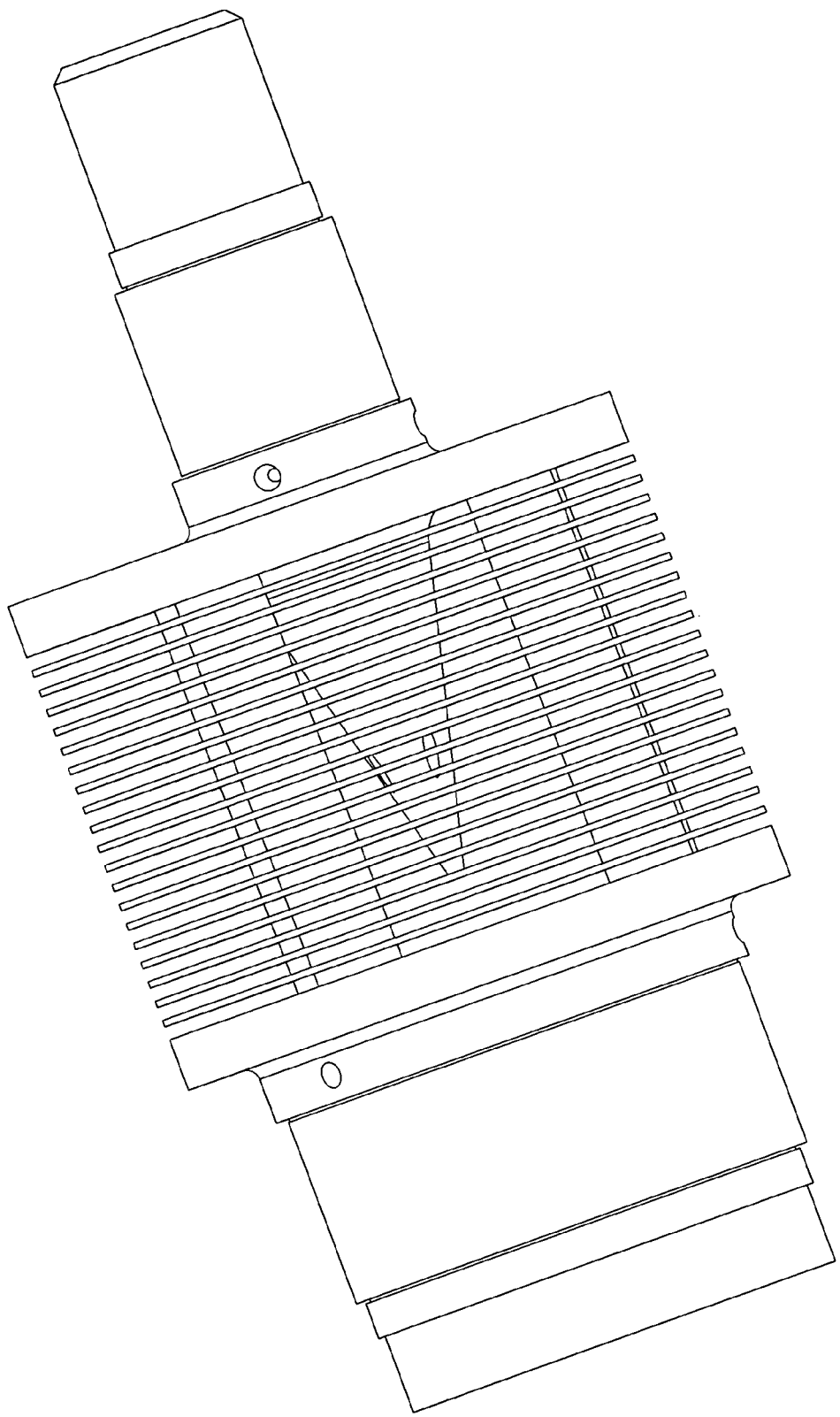
FIG. 36 is a side view of a disc pack according to an embodiment of the present invention.
Figure 37:
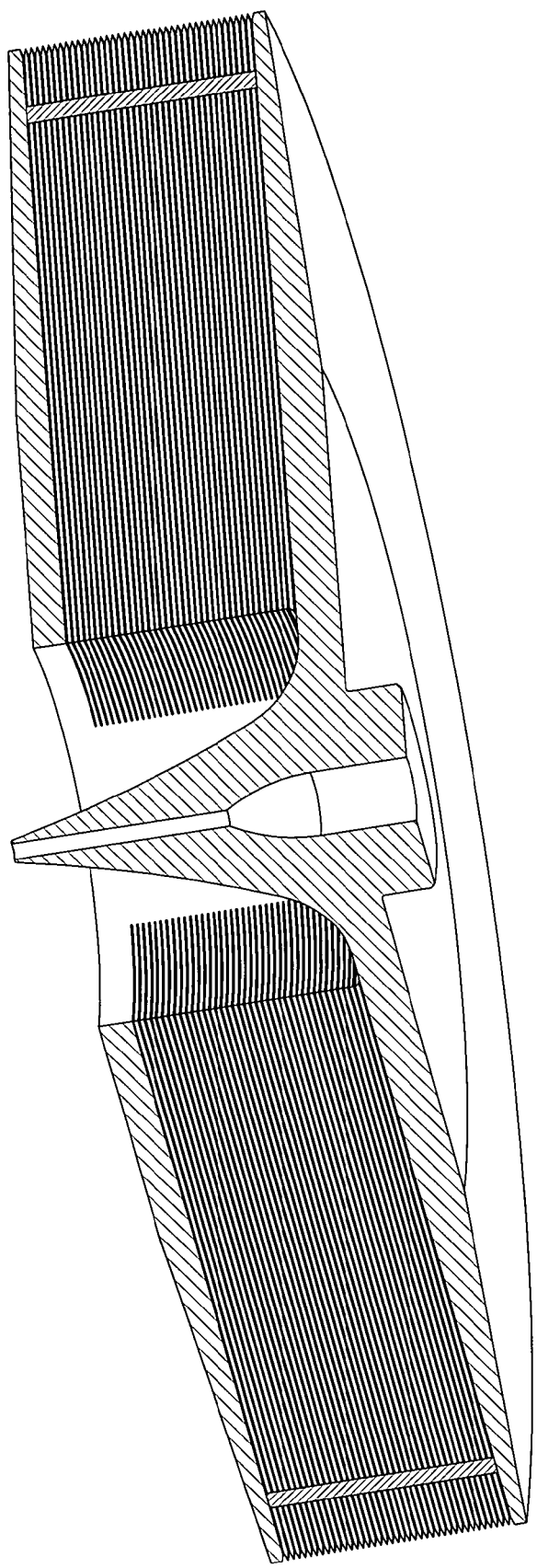
FIG. 37 is a cut-away side view of a disc pack which better illustrates the use of supports near the outer edges of the discs as implemented in an embodiment of the present invention.
Figure 38:
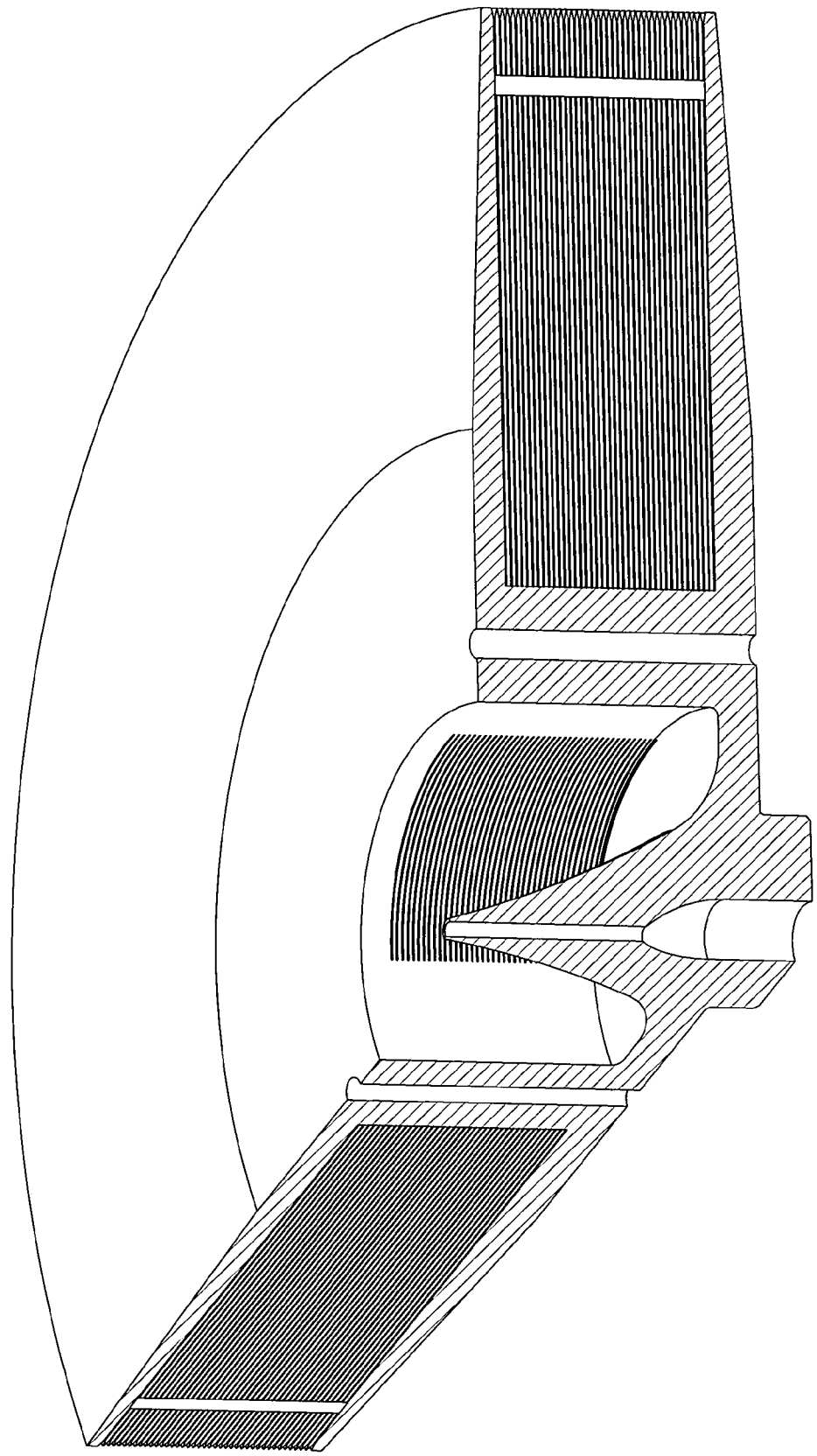
FIG. 38 is another cut-away side view of a disc pack, including the use of supports near the outer edges of the discs, according to an embodiment of the present invention.
Figure 39:
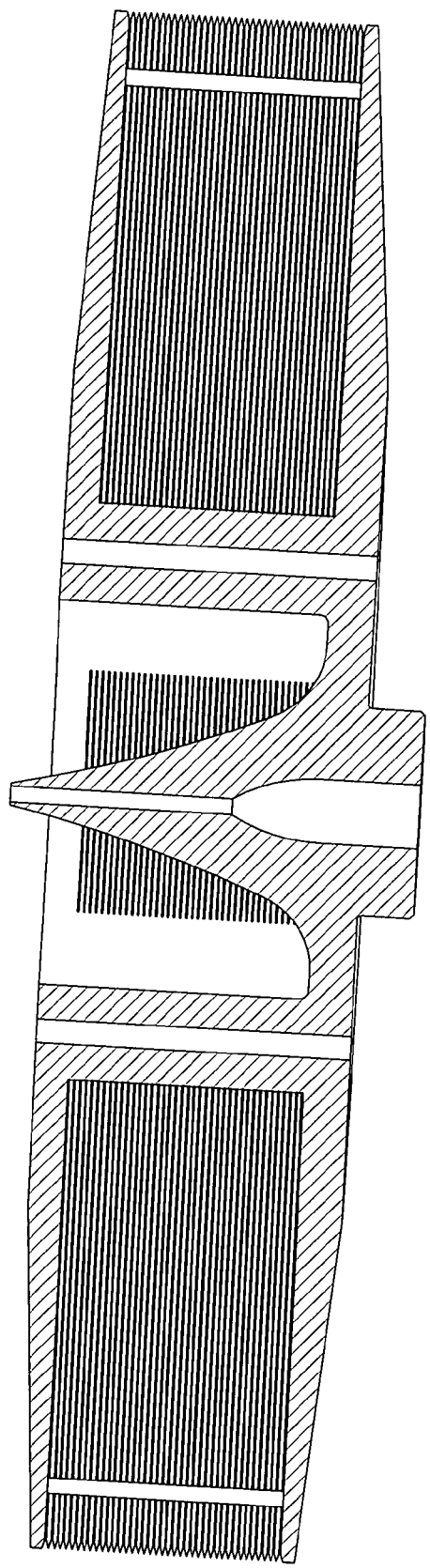
FIG. 39 is another cut-away side view of a disc pack, including the use of supports near the outer edges of the discs, according to an embodiment of the present invention.
Figure 40:
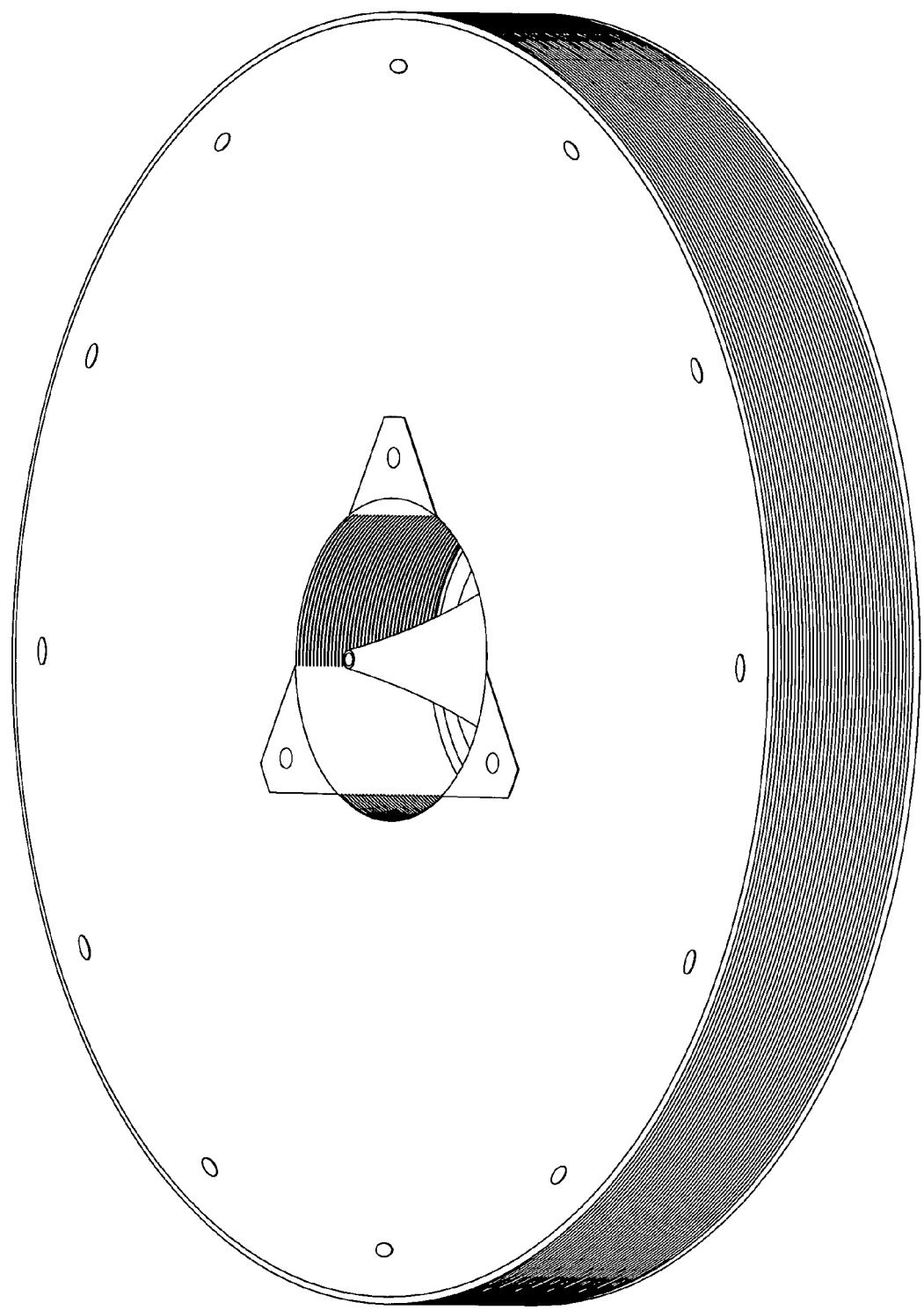
FIG. 40 is a perspective view of a disc pack according to an embodiment of the present invention.

FIGS. 33 through 40 illustrate a variety of alternative ventilation, cone attachment, disc support, and related means contemplated for use with the present invention. FIG. 33 is a cut-away side view of a disc pack according to an embodiment of the present invention. FIG. 34 is a cut-away side view of a disc pack according to an alternative embodiment of the present invention. FIG. 35 is a cut-away side view of a disc pack according to another alternative embodiment of the present invention. FIG. 36 is a side view of a disc pack according to an embodiment of the present invention. FIG. 37 is a cut-away side view of a disc pack which better illustrates the use of supports near the outer edges of the discs as implemented in an embodiment of the present invention. FIG. 38 is another cut-away side view of a disc pack, including the use of supports near the outer edges of the discs, according to an embodiment of the present invention. FIG. 39 is another cut-away side view of a disc pack, including the use of supports near the outer edges of the discs, according to an embodiment of the present invention. FIG. 40 is a perspective view of a disc pack according to an embodiment of the present invention.

As described above, one aspect of the present invention is that it takes in high-pressure gases, fluids, and the like, and expels them at a lower pressure. One anticipated embodiment of the present invention utilizes a boundary layer engine as a step-down converter for high pressure natural gas and other fluids. By way of example, without intending to limit the present invention, many homeowners utilize natural gas to heat their homes, ovens, and stove tops. When natural gas is distributed by a gas company, the natural gas is frequently distributed at very high pressures, such as 1000 pounds per square inch, which is significantly higher than can be safely used in the home. The gas companies use step-down flow regulators to reduce the pressure introduced into the home. These flow regulators waste a significant quantity of energy. An embodiment of the present invention would substitute a boundary layer engine for traditional flow regulators, thereby allowing the homeowner and/or the gas company to capture some of the energy from the natural gas line.

When used as a pump, the single-stage, multi-input port embodiment illustrated in FIGS. 23–32 can also be used to mix various compounds. In such an embodiment, as compounds are drawn into rotor case 2430 through inlet ports 2425, the compounds are well mixed due to their adhesion to discs 2450. Furthermore, as the compounds encounter exhaust cone 2475, a strong vortex is created which further mixes the compounds.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A boundary layer turbine, comprising:
   a housing, formed to create a cavity therein;
   at least one inlet port, wherein the inlet port is coupled to the housing;
   at least one outlet port, wherein the outlet port is coupled to the housing;
   a shaft, comprised of two ends, wherein at least one end of the shaft extends outside the housing, and at least a portion of the shaft extends within the housing;
   a plurality of discs with at least one hole at or near the center thereof,
   an exhaust cone, mounted at or near the center of the plurality of discs, wherein the exhaust cone includes at least one vacuum release tube; and,
   a mounting means, wherein the mounting means connects the plurality of discs to the shaft using a dovetail connection.

2. The boundary layer turbine of claim 1, wherein the plurality of discs are in physical contact with each other.

3. The boundary layer turbine of claim 2, wherein each of the plurality of discs are etched such that at least one channel is formed between the discs.

4. The boundary layer turbine of claim 1, wherein the mounting means uses an internal dovetail connection to connect the plurality of discs to the shaft.

5. The boundary layer turbine of claim 1, wherein the shape of the exhaust cone is controllable.

6. The boundary layer turbine of claim 1, wherein the discs are made of a ceramic material.

7. The boundary layer turbine of claim 1, wherein the discs are coated with a ceramic material.

8. The boundary layer turbine of claim 1, wherein the discs are coated with a catalyst.

9. The boundary layer turbine of claim 8, wherein the catalyst is Platinum.

10. The boundary layer turbine of claim 8, wherein the catalyst is an alloy comprised of a combination of at least Nickel and Tin.

11. The boundary layer turbine of claim 1, wherein the surface of the plurality of discs have been etched.

12. The boundary layer turbine of claim 1, wherein six inlet ports are used.

* * * * *